LOWERING OF ASSEMBLED MOLDS FROM ASSEMBLING MECHANISM TO CONVEYING CARS

Filed Aug. 25, 1951 13 Sheets-Sheet 1

INVENTORS
John A. Lasater
Thomas A. Deakins
BY R. F. Bryant
ATTORNEY

INVENTORS
John A. Lasater
Thomas A. Deakins
BY C. F. Bryant
ATTORNEY

INVENTORS
John A. Lasater
BY Thomas A. Deakins
C. F. Bryant
ATTORNEY

Oct. 23, 1956 J. A. LASATER ET AL 2,767,865

LOWERING OF ASSEMBLED MOLDS FROM ASSEMBLING MECHANISM TO CONVEYING CARS

Filed Aug. 25, 1951 13 Sheets-Sheet 4

INVENTORS
John A. Lasater
Thomas A. Deakins
BY C. F. Bryant
ATTORNEY

INVENTORS
John A. Lasater
Thomas A. Deakins
BY
C. F. Bryant
ATTORNEY

Oct. 23, 1956 J. A. LASATER ET AL 2,767,865
LOWERING OF ASSEMBLED MOLDS FROM ASSEMBLING MECHANISM TO CONVEYING CARS
Filed Aug. 25, 1951 13 Sheets-Sheet 6

INVENTORS
John A. Lasater
Thomas A. Deakins
BY C. F. Bryant
ATTORNEY

INVENTORS
John A. Lasater
Thomas A. Deakins
BY C. F. Bryant
ATTORNEY

INVENTORS
John A. Lasater
Thomas A. Deakins
BY
C. F. Bryant
ATTORNEY

Oct. 23, 1956 J. A. LASATER ET AL 2,767,865

LOWERING OF ASSEMBLED MOLDS FROM ASSEMBLING MECHANISM TO CONVEYING CARS

Filed Aug. 25, 1951 13 Sheets-Sheet 9

INVENTORS
John A. Lasater
Thomas A. Deakins
BY R. F. Bryant
ATTORNEY

INVENTORS
John A. Lasater
Thomas A. Deakins
BY R. F. Bryant
ATTORNEY

Oct. 23, 1956 J. A. LASATER ET AL 2,767,865

LOWERING OF ASSEMBLED MOLDS FROM ASSEMBLING MECHANISM TO CONVEYING CARS

Filed Aug. 25, 1951 13 Sheets-Sheet 11

INVENTORS
John A. Lasater
Thomas A. Deakins
BY C. F. Bryant
ATTORNEY

INVENTORS
John A. Lasater
Thomas A. Deakins
BY C. F. Bryant
ATTORNEY

INVENTORS
John A. Lasater
Thomas A. Deakins
BY R. F. Bryant
ATTORNEY

United States Patent Office 2,767,865

Patented Oct. 23, 1956

2,767,865

LOWERING OF ASSEMBLED MOLDS FROM ASSEMBLING MECHANISM TO CONVEYING CARS

John A. Lasater and Thomas A. Deakins, Chattanooga, Tenn., assignors to Combustion Engineering, Inc., a corporation of Delaware Application August 25, 1951, Serial No. 243,688

10 Claims. (Cl. 214—40)

This invention relates to the assembly of foundry molds by mechanized means such as are disclosed by earlier application Serial No. 200,899 on "Apparatus and Technique for Assembling Foundry Molds," filed December 15, 1950, in the names of Samuel C. Northington, Jr. and John A. Lasater and replaced by continuation application Serial No. 511,941, filed on May 31, 1955, for the same subject matter.

Broadly stated, the object of our invention is to better the performance of and cut down the number of operators needed to run a complete mold assembling installation of the aforesaid mechanized type.

A more specific object is to provide means identified with the mechanized installation's Mold-Off Station V for acting upon each assembled mold that is delivered by the central assembling machine to said station by first automatically withdrawing the mold from the machine and turning it horizontally through 90°, and then automatically setting the mold down upon an empty car approaching Station V on the outer mold car track for conveyance by that car into the installation's pouring area.

Another object is to organize our new mold take off facilities so that each assembled mold delivered by the central assembling machine to Station V will be withdrawn from the machine and lowered upon a conveying car entirely automatically without requirement for assistance from any operator at that station.

A further object is to interrelate our new mold take off facilities with the installation's car driving means in such a way that delay or stoppage in the aforesaid delivery of assembled molds to the empty mold cars approaching Station V will automatically stop the entire train of those cars until normal delivery is resumed, when the train will automatically be restarted.

A still further object is to provide other coordinations and control interlocks which facilitate progress of the mold components through the complete installation's mechanized cycle of mold assembly and casting production.

Other objects and advantages will become apparent as the disclosure and description hereof proceeds.

One illustrative form of apparatus provided by us for practicing this invention is disclosed by the accompanying drawings wherein:

Fig. 1 is a top plan view showing the automatic mold take off facilities of our invention applied to Station V of a mold assembling installation that is organized in accordance with Northington-Lasater application Serial 200,899 and that utilizes a central indexing machine surrounded by five cooperating stations which supply the machine with sand charged drag flasks and cope flasks plus green sand cores and which receive therefrom assembled molds ready for pouring;

Figure 1:
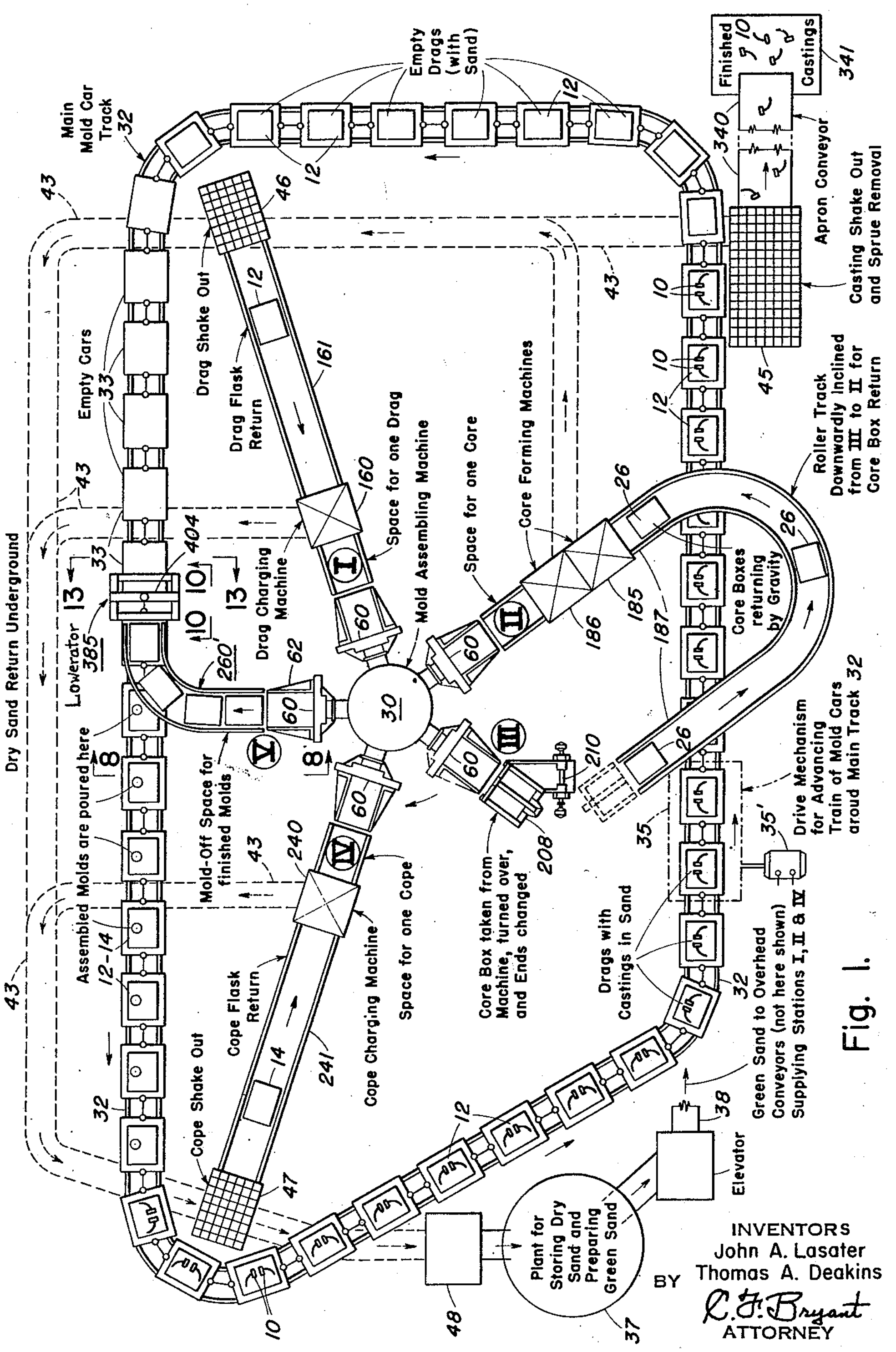
Figures 7, 7A:
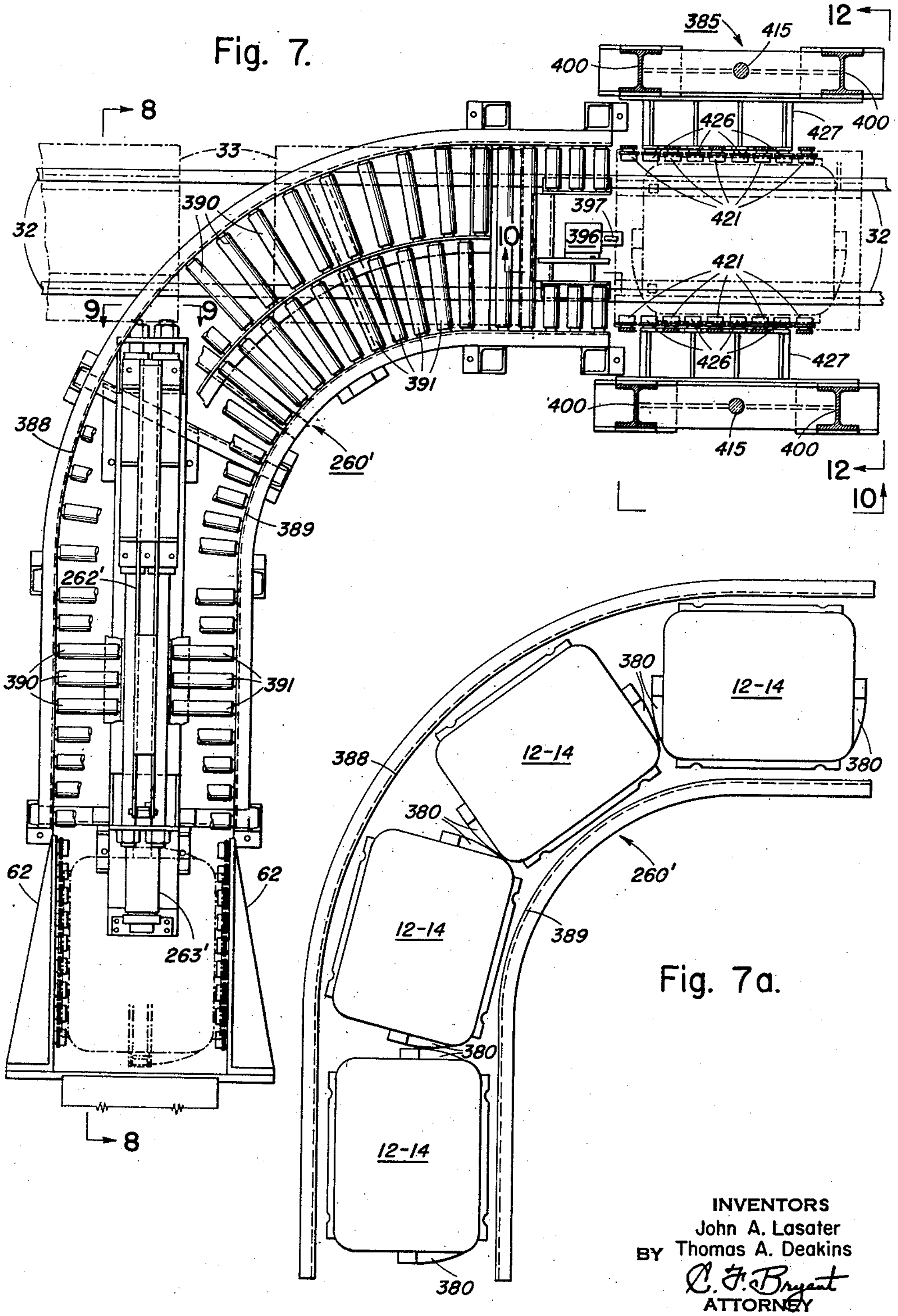
Fig. 7 is an enlarged top plan view of the Station V portion of the Fig. 1 system showing further details of the inventively new mold take off apparatus provided by us at that Station V.
Figures 8, 8A, 8B, 9:
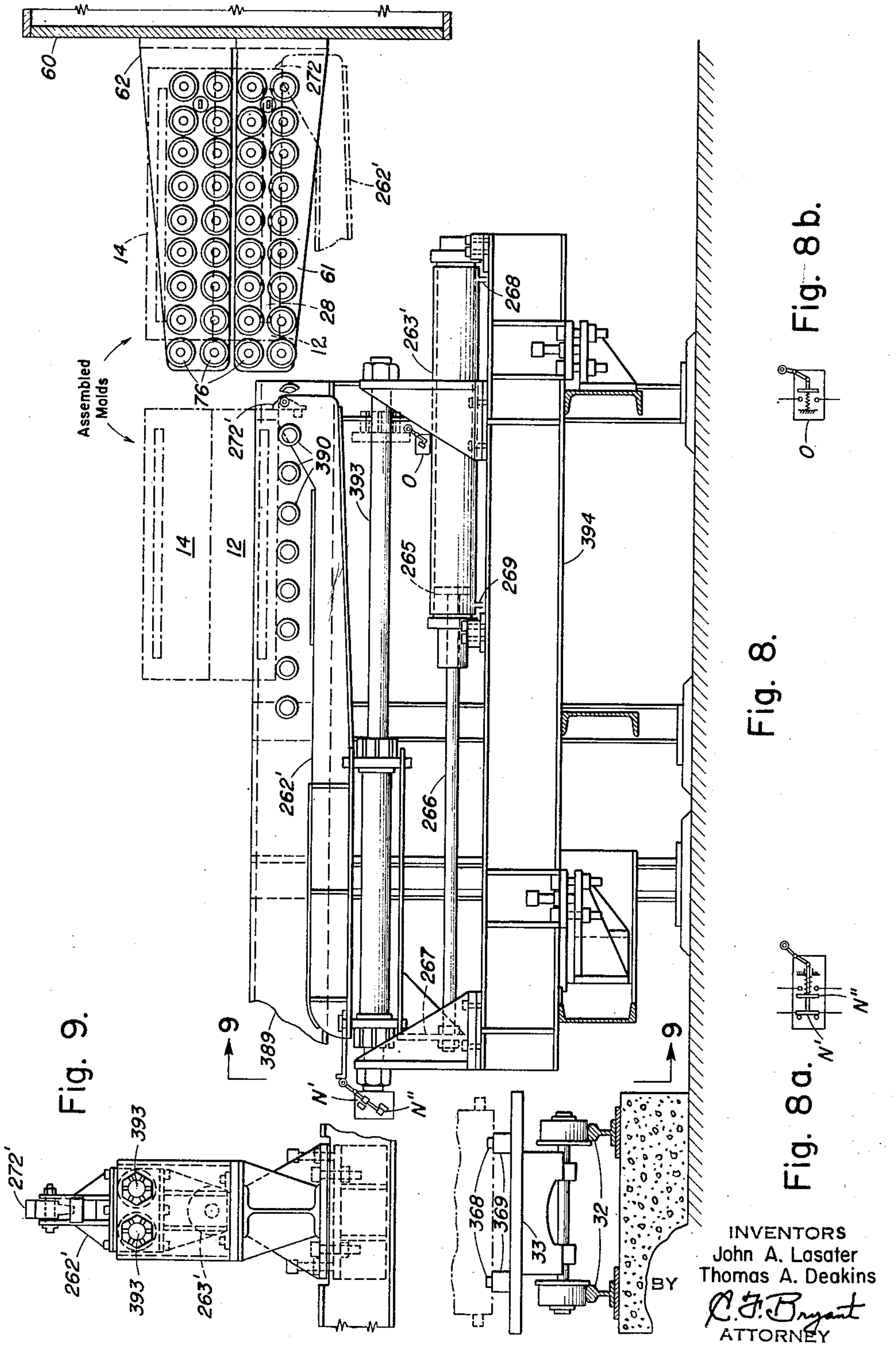
Figures 10, 11:
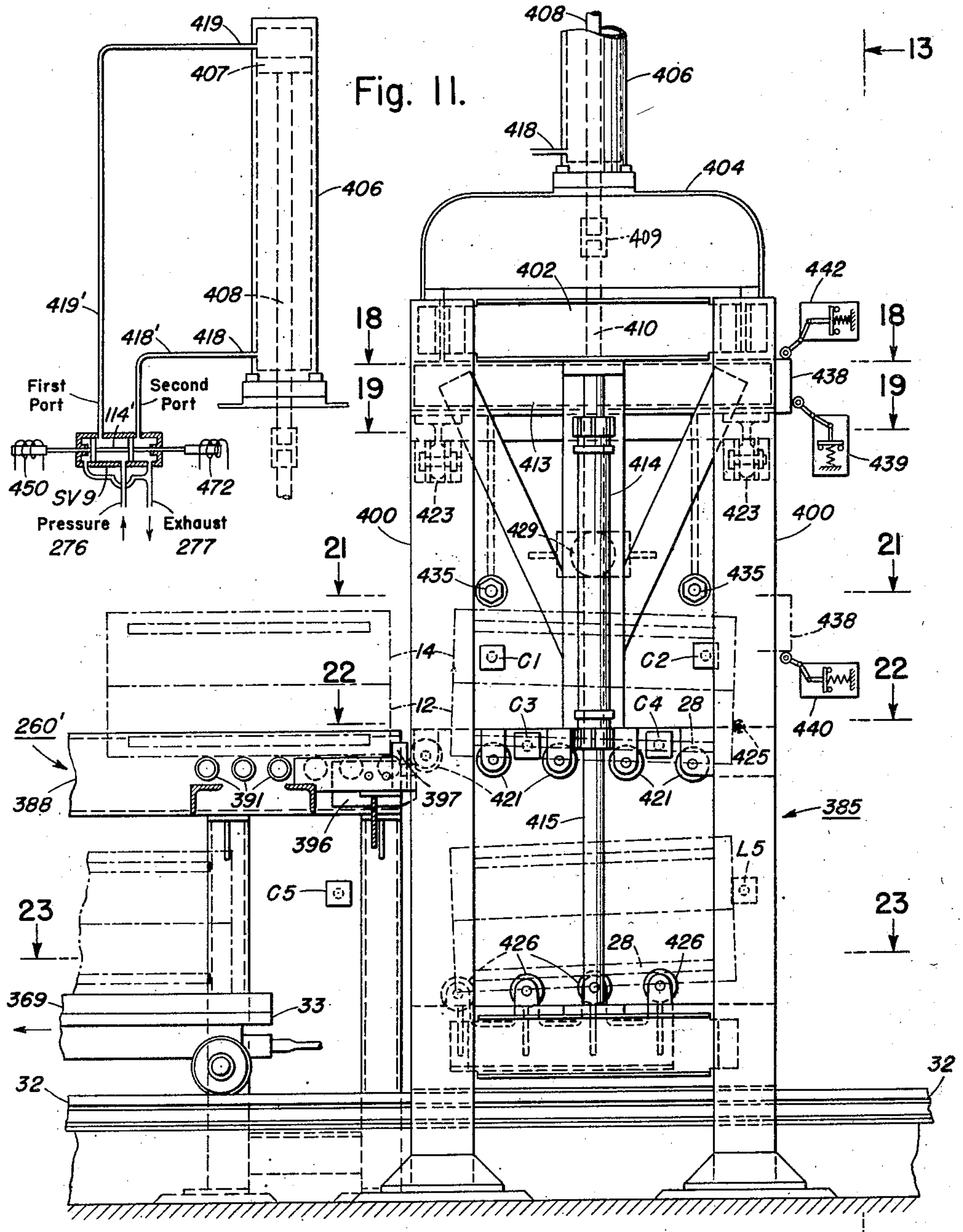
Figure 12:
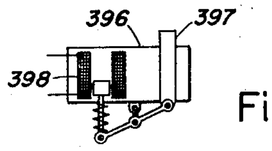
Figure 13:
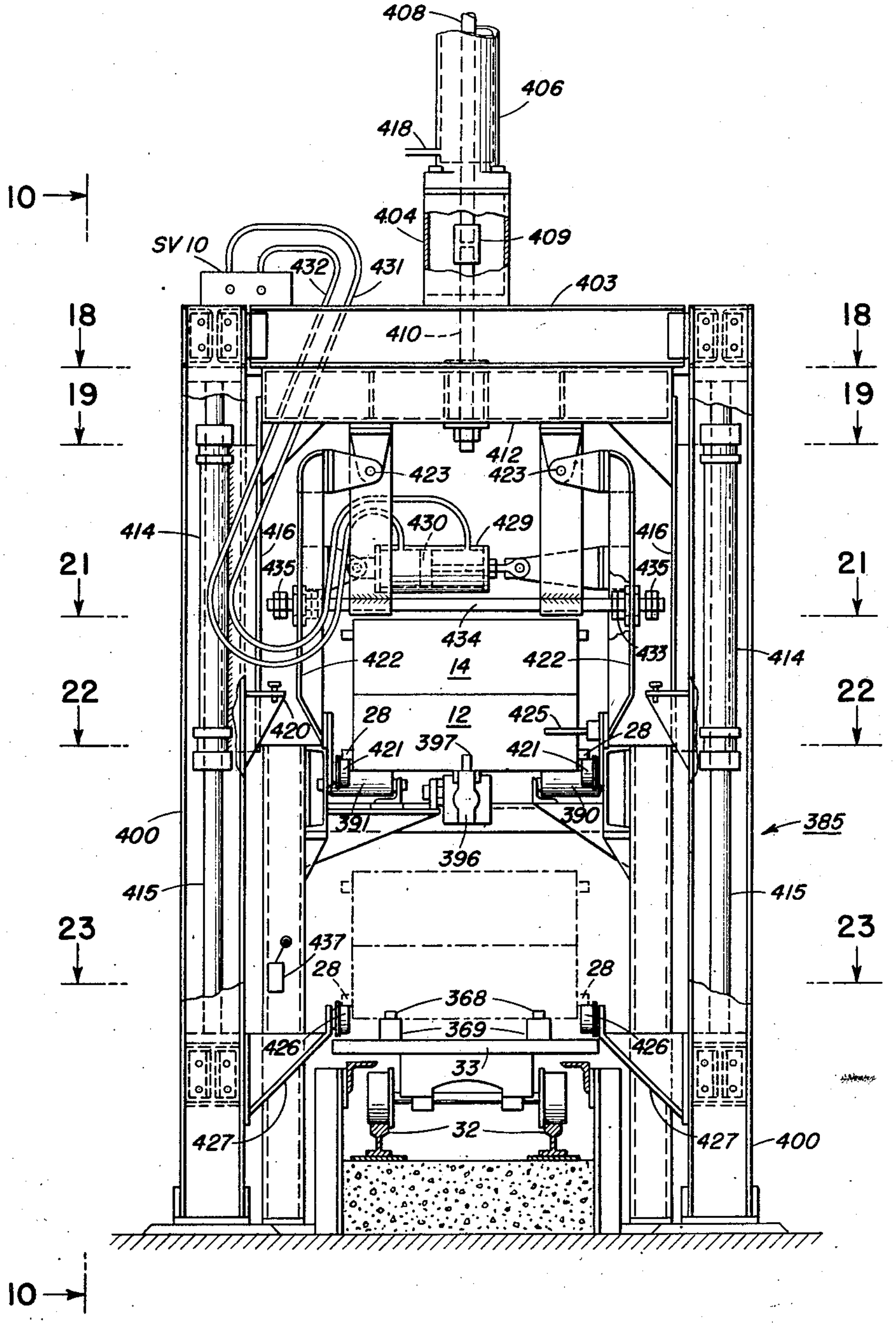
Figure 14A:
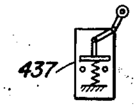
Figure 14:
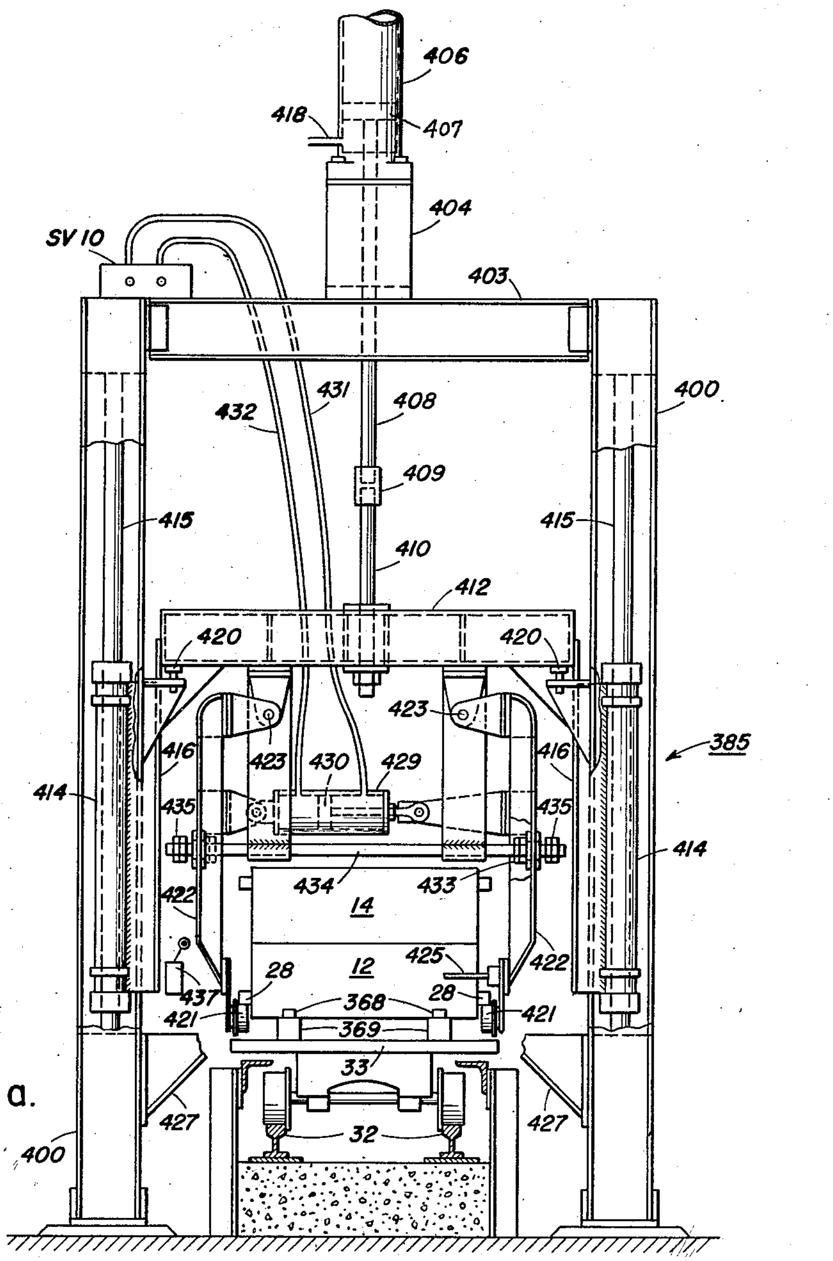
Figure 15:
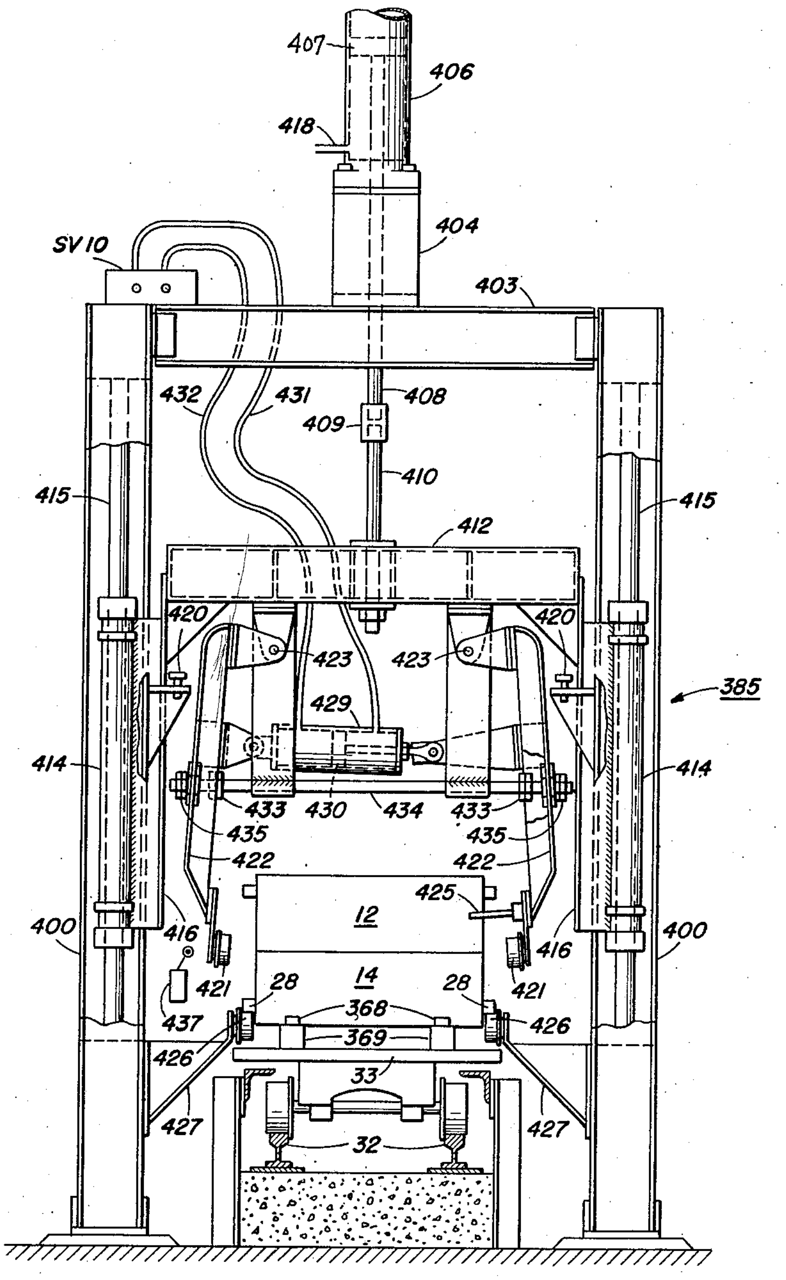
Figures 16, 17:
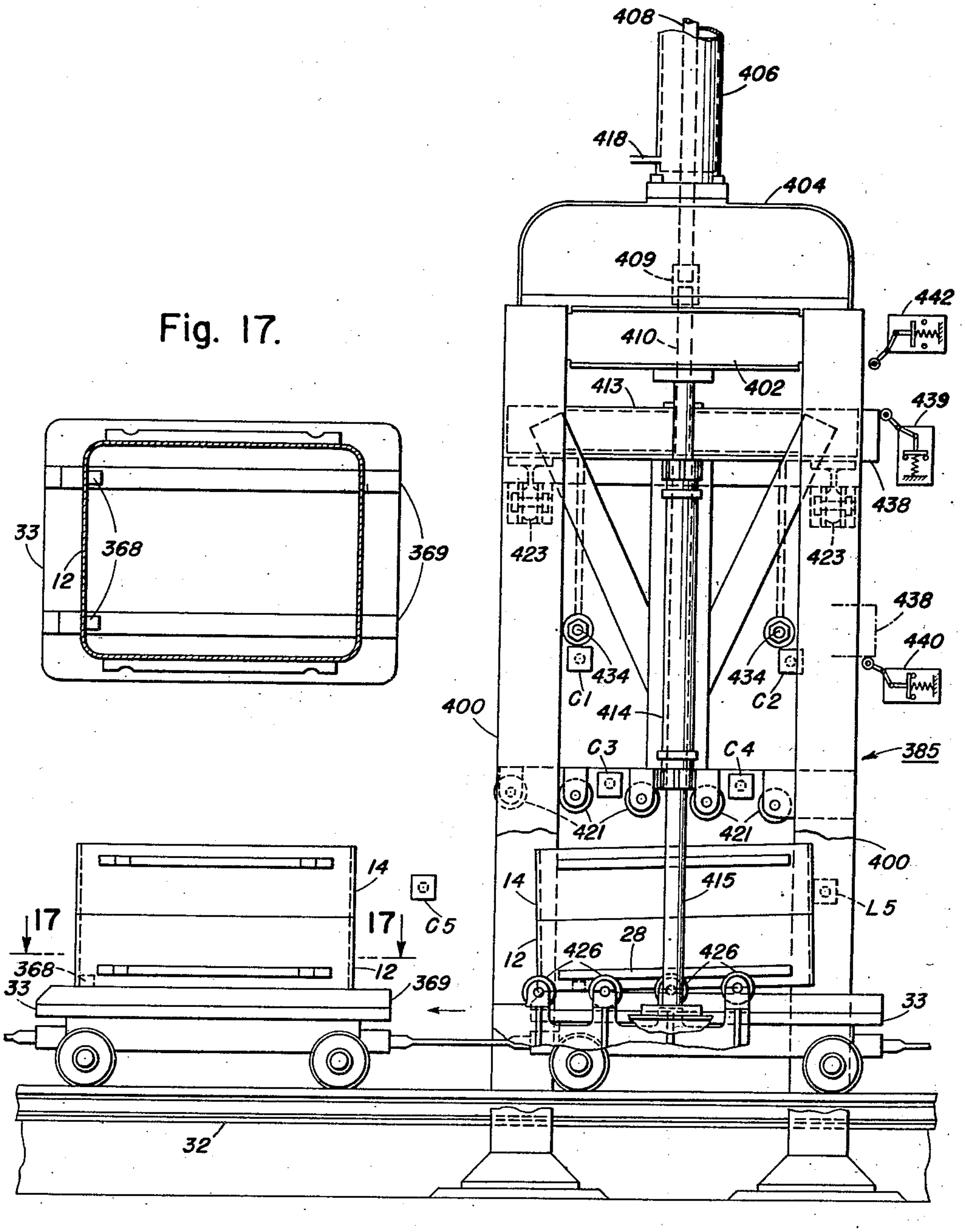
Figure 18:
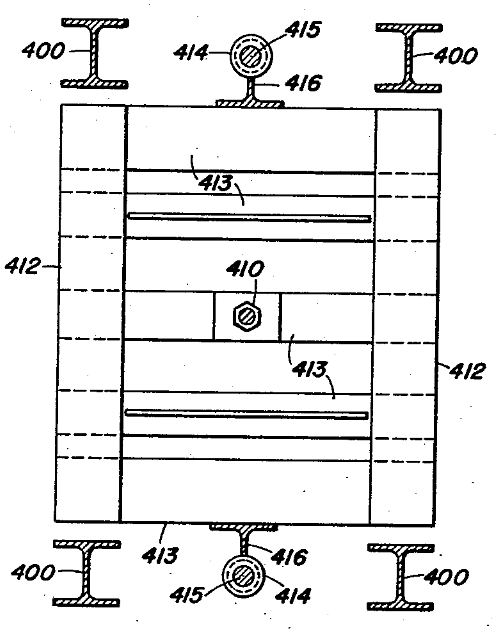
Figure 19:
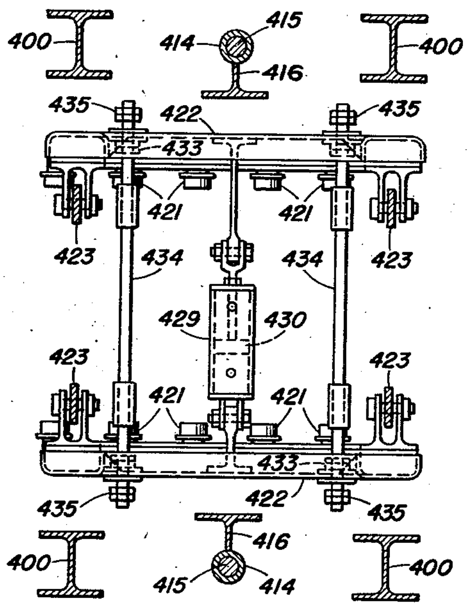
Figure 20:
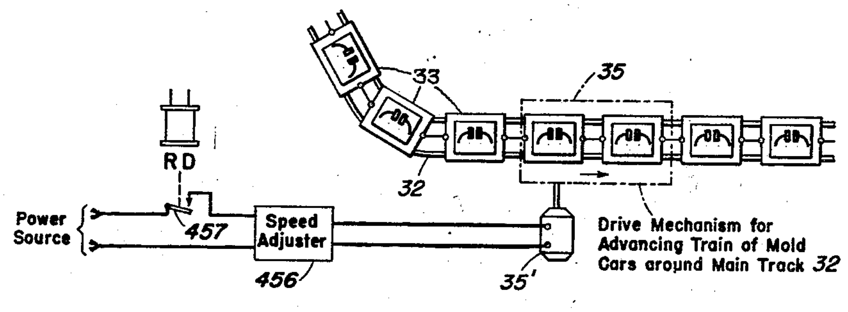
Figure 21:
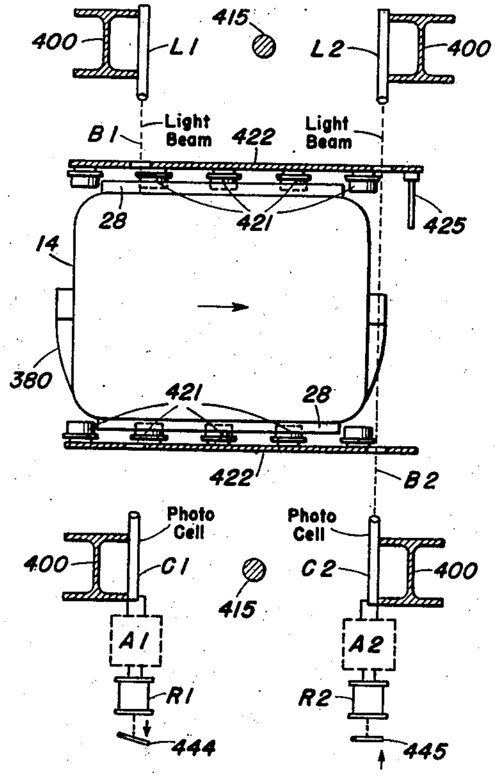
Figure 22:
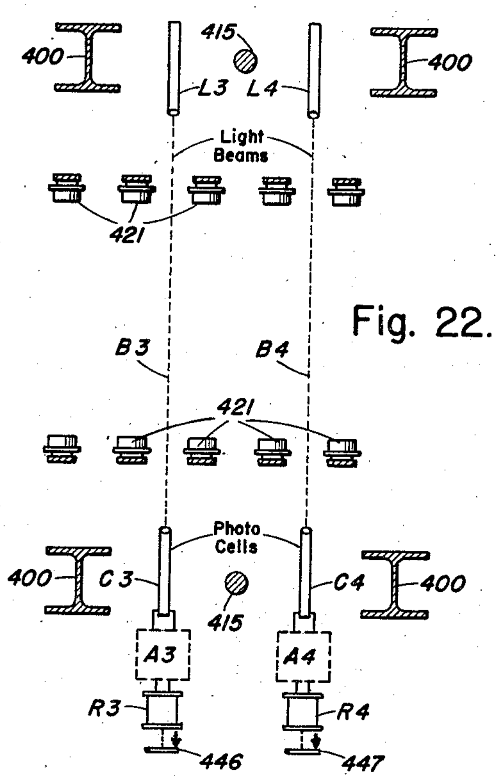
Figure 23:
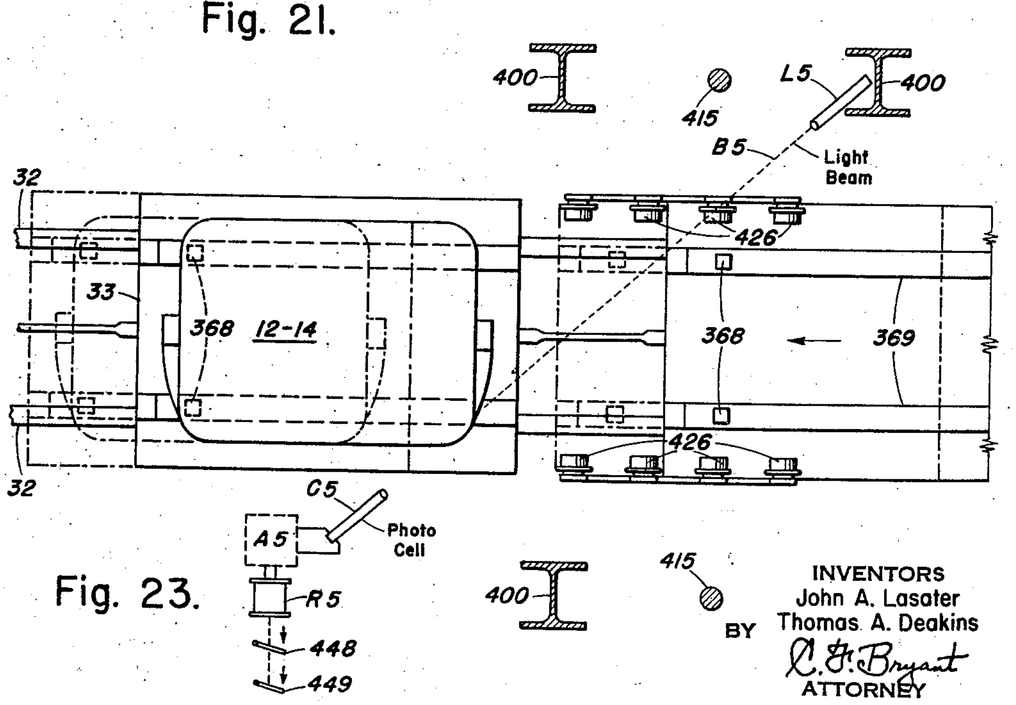
Figures 24A, 25:
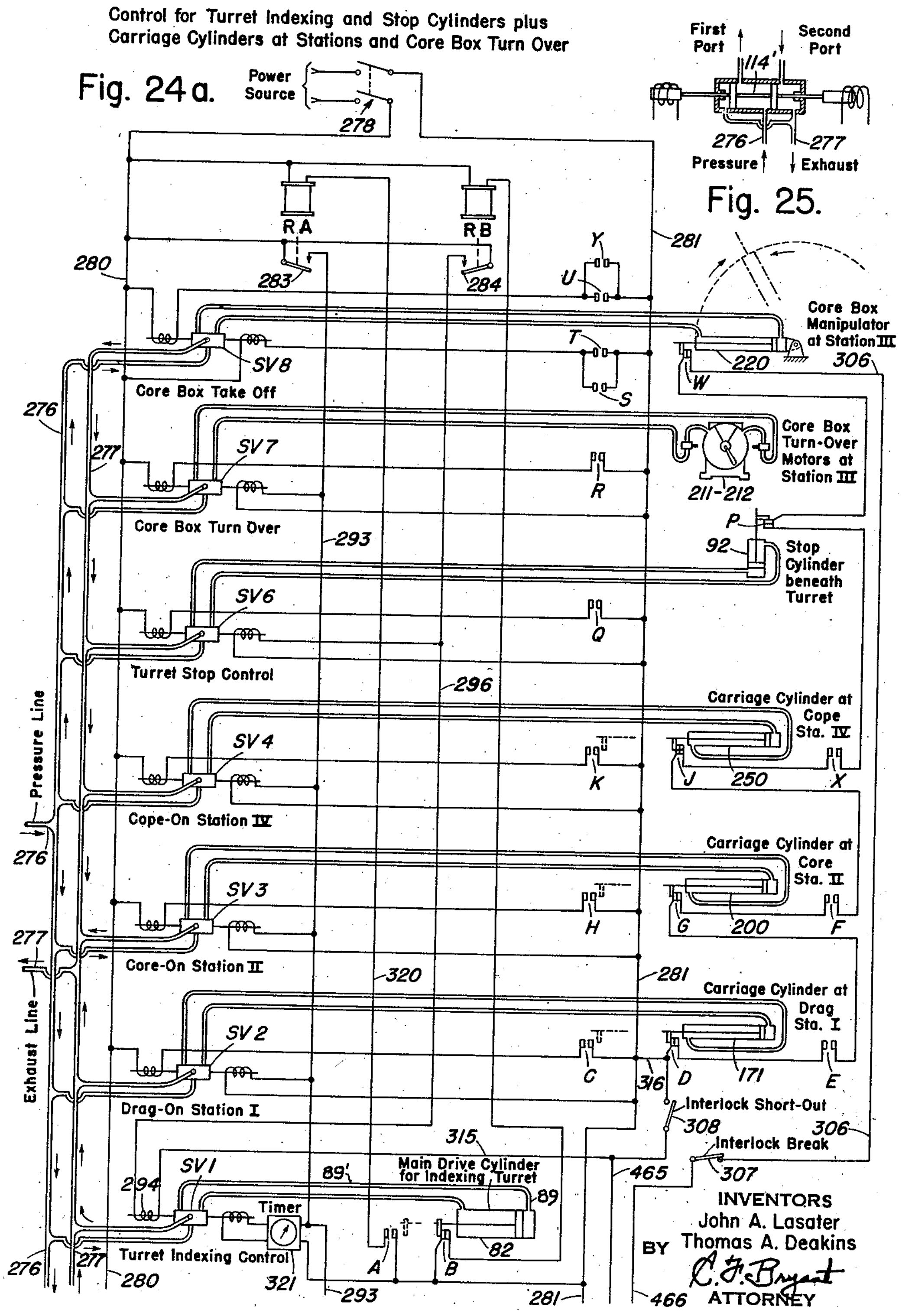
Figure 24B:
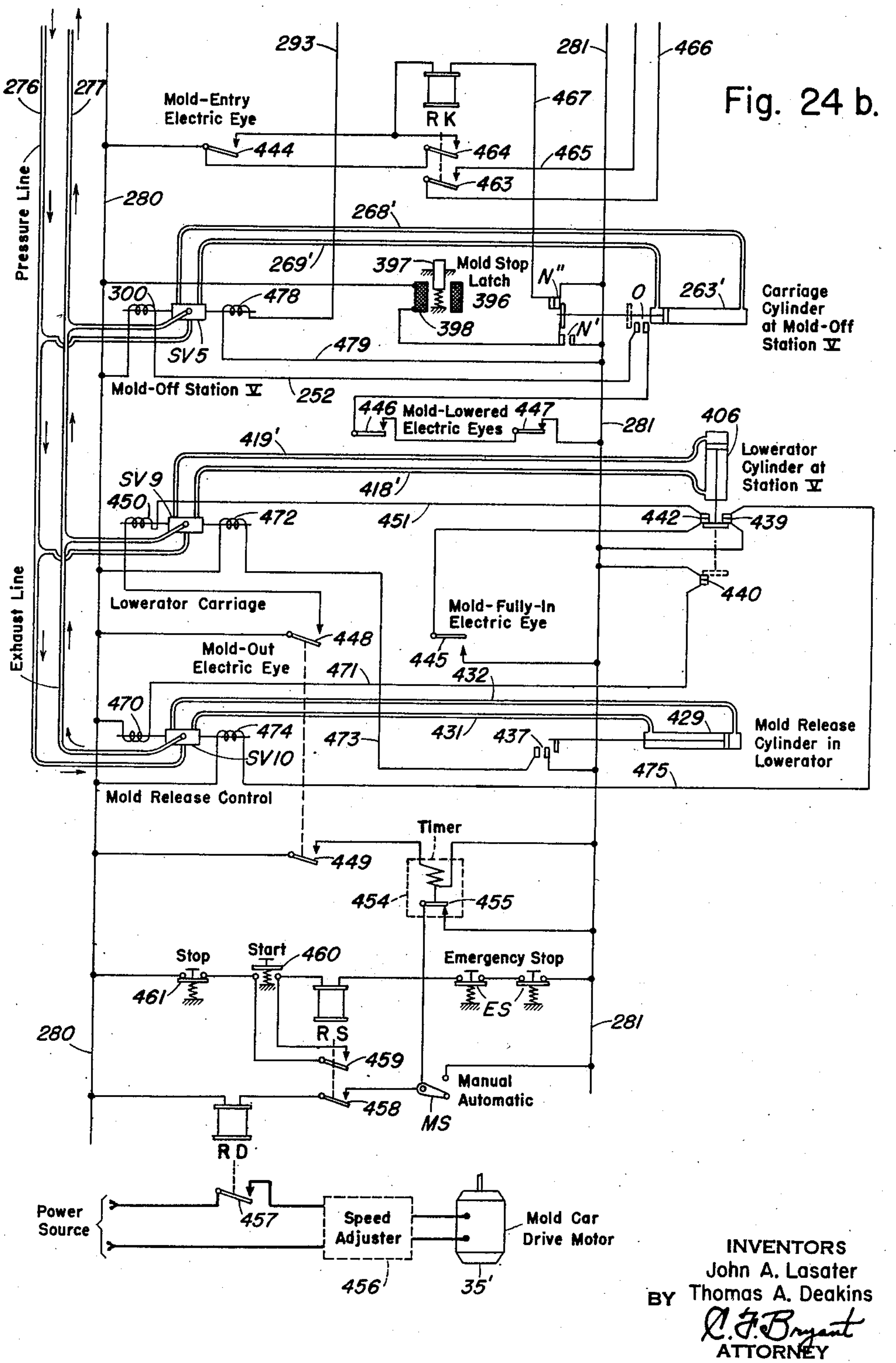

Fig. 7*a* reproduces the curved take off track of Fig. 7 and shows four assembled molds being advanced therethrough by the aid of contacting bumpers on the drag flasks;

Fig. 8 is a diagrammatic representation taken from line 8—8 of Figs. 1 and 7 showing the manipulator apparatus provided by us at Station V to withdraw the completely assembled molds from the central machine and advance them along the curved take off track;

Figs. 8*a* and 8*b* are schematic showings of two control switches which are included in the Fig. 7–8 manipulator apparatus at Station V;

Fig. 9 is a view on line 9—9 of Fig. 8 looking at the end of the mold-withdrawing manipulator apparatus of Fig. 8;

Fig. 10 is a view in side elevation on line 10—10 of Figs. 7 and 13 (and also Fig. 1) showing our new lowerator mechanism for receiving each assembled mold from the curved take off track and lowering it upon an empty conveyor car passing therebeneath along the outer mold track;

Fig. 11 shows further details of the hydraulic cylinder by which the lowerator apparatus of Fig. 10 is operated;

Fig. 12 is a schematic showing of the mold stop latch provided at the curved take off track's discharge end as indicated by Figs. 7 and 10;

Fig. 13 is a view on line 13—13 of Fig. 10 (and also Fig. 1) showing how the lowerator mechanism of our invention appears when viewed from the left end of the Fig. 1 representation;

Fig. 14 shows the lowerator of Fig. 13 with the carriage thereof in its lowermost position as contrasted with Fig. 13 wherein the carriage occupies the uppermost position;

Fig. 14*a* is a schematic showing of the interlock switch utilized by the apparatus of Fig. 14 to register an opening of the mold lowering rollers following delivery of an assembled mold upon receiving stationary rollers at the apparatus bottom;

Fig. 15 is similar to Figs. 13 and 14 but differs therefrom by showing the movable carrying rollers in their opened position and the lowerator carriage moving upwardly towards its top position;

Fig. 16 is generally similar to Fig. 10 but differs therefrom by showing the lowerator carriage nearly returned to its top position instead of fully returned thereto as in Fig. 10;

Fig. 17 is a view on line 17—17 of Fig. 16 showing how each assembled mold delivered by the lowerator upon a conveying car is positioned thereon with respect to supporting members on the car top;

Fig. 18 is a view on line 18—18 of Figs. 10 and 13 showing how the lowerator carriage appears when viewed from the top;

Fig. 19 is a generally similar section on line 19—19 of Figs. 10 and 13 showing how the movable mold carrying rollers of the lowerator carriage are mounted in a way permitting spreading and reclosure by a hydraulic cylinder;

Fig. 20 is a control diagram showing means for stopping movement of the train of mold cars at proper times;

Fig. 21 is a view on line 21—21 of Figs. 10 and 13 showing some of the electric eye control devices which are incorporated in our new lowerator apparatus;

Fig. 22 is a similar view on line 22—22 of Figs. 10 and 13 showing other electric eye control devices also utilized by the same apparatus;

Fig. 23 is a generally similar view on line 23—23 of Figs. 10 and 13 showing the lowermost electric eye control device used by the lowerator apparatus to coordinate movement of the mold car train with delivery of assembled molds upon empty cars passing beneath the lowerator;

Figs. 24*a* and 24*b* when placed together in bottom-to-top relationship constitute a diagrammatic showing of hydraulic and electrical control circuits utilized to operate our mold take off and lowerator apparatus at Station V in coordinated relationship with the central assembling machine and its associated station apparatus comprising the complete installation shown by Fig. 1; and Fig. 25 shows typical internal construction for each of the ten solenoid valves utilized in the control system of Figs. 24*a*–24*b*.

*The mold assembling and casting production practices to be benefited*

The automatic mold take off and lowerator improvements of our invention are here illustratively shown as being applied to mold assembling and casting production apparatus organized as per the aforesaid earlier Northington-Lasater application Serial No. 200,899, filed December 15, 1950, under title of Apparatus and Technique for Assembling Foundry Molds.

Figure 3:
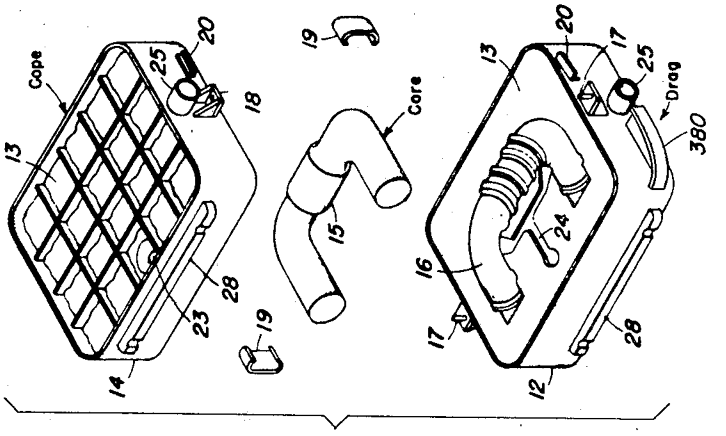
Fig. 3 is an exploded view showing the components of a typical mold for casting two of the quarter-bend soil pipe fittings of Fig. 2.

That apparatus is suitable for the production of castings having a wide variety of sizes, characters (including solid as well as hollow formation) and shapes. Of these the quarter bend soil pipe elbow represented at 10 in Fig. 3 may be considered as typical. To produce castings such as 10 in static molds of conventional character requires preparation and assembly of the component parts for each mold which are represented in Fig. 3.

These include a lower flask half 12 referred to as the "drag"; an upper flask half 14 referred to as the "cope"; suitable "green" sand 13 or the like packed into both the drag and cope for receiving cavity impressions 16 from the casting pattern (not here shown); and a core 15 ("green" sand or other) placed within the mold cavity to form the hollow interior of casting 10. In the illustration here made the aforesaid casting pattern and cooperating core 15 are both shaped to provide for simultaneously casting two of the quarter bend fittings 10 in each mold 12—14 when assembled as indicated in Fig. 4; and the represented "green" sand core 15 is shown as being provided with a reinforcing arbor indicated at 21 in Figs. 5 and 6.

Figures 4, 5, 6:
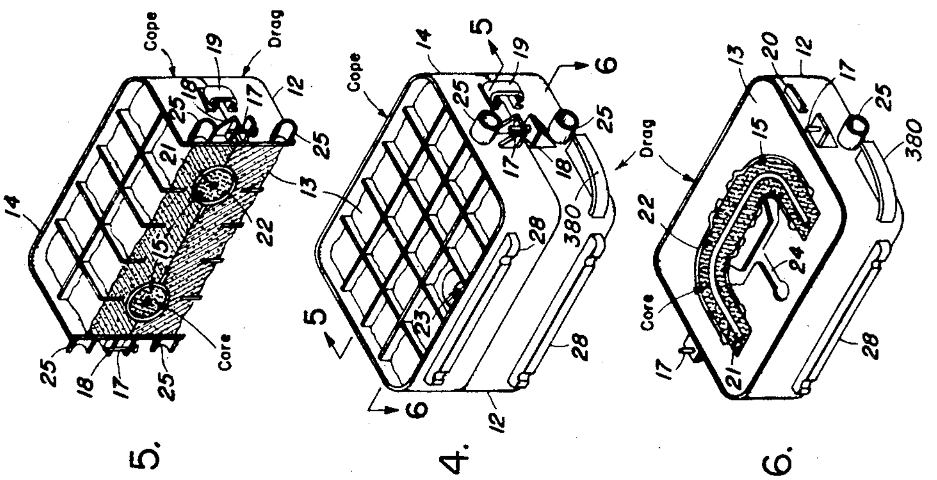
Fig. 4 shows how the drag, core and cope of Fig. 3 appear after they have been brought together to produce an assembled mold ready for pouring.
Fig. 5 is a section in vertical elevation on line 5—5 through the assembled mold of Fig. 4.
Fig. 6 is a view from line 6—6 of Fig. 4 showing the top of the drag and the interior of the core resting in the mold cavity thereof.
Figure 2:
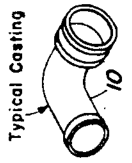
Fig. 2 represents a typical casting which may be produced in a mold that is assembled by the apparatus diagrammed in Fig. 1.

From Figs. 4–5–6 it will be seen that after mold assembly the core 15 rests in cavity 16 of the drag 12; that cope 14 has been lowered upon the drag where it is maintained in accurately aligned relationship by pins 17 upstanding from the drag ends over which are fitted mating brackets 18 attached to the cope ends; and that the two flask halves 12 and 14 are held together by opposing end clamps 19 that engage cooperating lugs 20 on the drag and cope frames.

When so assembled there is provided within the mold interior an open cavity space shown at 22 in Figs. 5–6 into which space there flows molten metal when poured from a ladle (not shown) into the sprue opening 23 (see Figs. 3–4) in the cope sand; said poured metal flowing downwardly through opening 23 and then horizontally through passage 24 (see Figs. 3 and 6) in the drag sand and thence into the aforesaid mold cavity 22 communicating with that passage.

In the aforesaid earlier Northington-Lasater application Serial No. 200,899, it is pointed out that preparation of the mold components shown by Fig. 3 involves not only packing sand 13 or the like into the drag flask 12 and cope flask 14 but also accompanying manipulations of a core box required to form the core 15 of Fig. 3 and place it in the cavity 16 of drag 12; that the drag flask 12 and the cope flask 14 each must face down over its pattern half when charged with sand 13 or the like, yet in the finally assembled mold the drag 12 is required to face up as Figs. 4–5–6 show; that the lower core box half (designated as 26 in Fig. 1) must face up while the core 15 is being formed therein, yet roll over thereof along with the drag 12 is necessary incident to transferring the core 15 from the box half; that the sand-charged cope 14 must thereafter be brought together with this core-carrying drag 12 and secured thereto in order to provide a finished mold (Fig. 4) that is ready for pouring; and that the aforesaid mold components are typically heavy (the assembled mold of Fig. 4 weighing nearly 400 pounds) and cumbersome (said Fig. 4 mold having inside dimensions of 26 inches by 20 inches and being 14 inches tall) and therefore difficult to handle.

*Illustrative mold assembling facilities improvable by our invention*

In accordance with said Northington-Lasater application Serial No. 200,899 the preparation, manipulation and assembly operations are accomplished mechanically and more or less automatically; mold assembly speed thereby being increased and various other benefits being made available. In Fig. 1 hereof illustrative apparatus for accomplishing such mechanized assembly of the molds is diagrammatically represented as utilizing a central indexing machine 30.

Said central mold assembling machine 30 is equipped with a turret rotatable about a vertical axis and provided with five arm heads 60 spaced circumferentially (72° apart) around the turret. Each of these five arm heads 60 is mounted for roll over about a horizontal axis radial to the turret center; and carried by each head are upper and lower flask receiving arms that extend outwardly from the head in radial relation to the turret, the upper and lower arms in each of these head sets being adapted for movement towards and away from each other.

Provision is made for successively advancing machine 30's central turret through the angular distance (72°) between arm heads 60 whereby each set of upper and lower arms progressively occupies at-rest positions spaced around the turret periphery's rotative path at the station locations designated I—II—III—IV—V in Fig. 1.

At the first or "Drag-On" Station I of Fig. 1 use is made of drag charging machine 160 and cooperating facilities for inserting into the upper arm of each head 60 there coming to rest a sand charged drag flask 12 (Fig. 3) having its pattern impression 16 facing down.

At the second or "Core-On" Station II of Fig. 1 there are provided core forming machines 185—186 and cooperating facilities for inserting into the lower arm of each head 60 there coming to rest a core box half 26 having a finished core 15 therein facing up from the box half.

Following Station II is a third or "Core-Box-Off" Station shown at III in Fig. 1; and cooperating with the turret of central machine 30 are control means responsive to advancement by the turret of each arm head 60 from Station II to Station III for first moving the upper and lower arms on that head together thus bringing the core 15 into the drag 12's pattern cavity 16 (Fig. 3) and then rolling said arms through 180° about the head axis thus placing the drag 12 on the bottom and the core 15 on top thereof with the core box half 26 above the core and then moving the two arms away from each other thus lifting the core box half 26 free both of the drag 12 and the core 15 now resting in the drag's pattern cavity.

At the aforesaid "Core-Box-Off" Station III is mechanism 208—210 plus cooperating facilities for withdrawing the empty and now inverted core box half 26 out of the upper arm of each turret head 60 there coming to rest, for turning that box half over and interchanging its two ends, and for returning it to "Core-On" Station II via the gravity track 187 of Fig. 1.

At the fourth or "Cope-On" Station IV of Fig. 1 use is made of cope charging machine 240 and cooperating facilities for inserting into the upper arm of each head 60 there coming to rest a sand charger cope flask 14 (Fig. 3) having its pattern impression facing down.

Following Station IV is a fifth or "Mold-Off" Station shown at V in Fig. 1; and cooperating with the turret of central machine 30 are control means responsive to advancement by the turret of each arm head 60 from Station IV to Station V for moving the upper and lower arms of that head together thus bringing the cope 14 together with the drag 12 with the cope's pattern cavity fitting over the core 15 now supported by the drag.

At the aforesaid "Mold-Off" Station V is a conveyor track 260′ plus cooperating facilities for withdrawing from the two closed arms of each turret head 60 there coming to rest the now assembled mold made up of the drag 12, core 15 and cope 14 brought together as just described; this take-off track 260′ being curved in accordance with the present invention for a purpose later to be made evident.

And cooperating with central machine 30's turret are further control means responsive to advancement by the turret of each arm head 60 from Station V to the first named "Drag-On" Station I for moving the upper and lower arms on that head away from each other preparatory to repeating the mold assembly cycle outlined above.

Adaption of the drag flask 12, the cope flask 14 and the core box half 26 for the aforesaid handling by this central mold assembling machine 30 is effected by providing each of these mold parts with the side bars represented at 28 in Figs. 3, 4 and 6; attachment of these side bars 28 to the metal side walls of each drag, cope and core box being effected by welding or in other suitable manner as said earlier Northington-Lasater application more fully describes.

In the installation reproduced by Fig. 1 hereof from the aforesaid Northington-Lasater application Serial No. 200,899 the central indexing machine 30 is surrounded by the five cooperating Stations I—II—III—IV—V above described and the various devices at those five stations are in turn surrounded by a main track 32 arranged in a continuous loop or closed circuit and carrying a relatively large number of mold cars 33 coupled together into a continuous string or unbroken train; the original track layout of said earlier application bending directly around cope shake out 47 as here represented.

All of the mold cars 33 in the named train are slowly advanced around track 32 in counter-clockwise direction, as indicated by the arrows of Fig. 1; such advancement being effected by drive mechanism 35 powered by a motor 35′. In the illustrative organization here shown, each car 33 comprises a flat top or platform somewhat larger than the drags 12 and assembled molds 12—14 to be carried thereon; each of these platforms is supported by four wheels (see Figs. 8, 10, 13, 14, 15, 16) that ride on the parallel rails of track 32 in conventional manner; and the drive mechanism 35 is positioned beneath track 32 and provided with means for engaging successive cars 33 and thereby pushing the entire train around the track at a speed selectable from about nine to twenty-four feet per minute, with a car speed of about fourteen feet per minute being typical.

Sand (designated at 13 in Figs. 3-4-5-6) of so called "green" grade or other suitable material for charging the drags 12 and copes 14 and forming the cores 15 is supplied to Stations I, II and IV of the Fig. 1 installation from a sand plant 37 via a system of overhead conveyors (not here shown). Those conveyors carry the "green" sand prepared in plant 37 from elevator outlet 38 to receiving hoppers (not shown) provided at the aforesaid three stations as more fully disclosed by Northington-Lasater application Serial 200,899.

Spillage sand from said Stations I, II and IV is conveyed back to plant 37 by a system of underground return conveyors 43. These conveyors pick up sand not only from Stations I, II and IV but also from a casting shake out 45, a drag shake out 46 and a cope shake out 47; they return the so picked up sand to an elevator 48 which carries it from the underground level to the top of an elevated storage bin from which the sand is released as needed into mixing, moistening and other apparatus used to prepare it for redistribution to Stations I, II and IV via overhead conveyors 38.

*Operation of Fig. 1 installation before improved as per present invention*

The installation reproduced by Fig. 1 hereof from the aforesaid Northington-Lasater application Serial No. 200,899 provides automatic mold assembling operation of "continuous" variety from which a high rate of casting production is possible.

In accordance with the practice which preceded the present invention, the assembled molds 12—14 taken out of the central machine 30 at Station V were successively transferred to the portion of track 32 that is adjacent to said station (or in advance thereof if desired) by the aid of a powdered hoist run by an operator who manually placed them upon empty conveyor cars 33. As these assembled molds travel further around the track 32 pouring thereof is accomplished in conventional manner prior to their approach to the cope shake out 47 identified with Station IV.

Upon arrival of the poured molds at said shake out 47 the end clamps 19 (see Figs. 3-4-5) are removed (in said original installation); and the copes 14 are thereupon lifted away from the drags 12 by a powered hoist run by an operator who (in said original installation) manually places them upon cope shake out 47 leading (via return track 241) to cope charging machine 240.

Said drags 14 with the exposed solidified castings 10 therein then continue to travel on cars 33 counterclockwise along the main track 32 around cope shake out 47 of Fig. 1; then passing beneath the core box return track 187 which extends from Station III to Station II. As these drags 12 with cooled castings 10 therein approach the casting shake out 45 of Fig. 1, operators there withdraw (by the aid of the customary hooks) the castings 10 from the drag sand along with the sprue iron (not shown) which has solidified in the sprue passage.

The castings 10 and their attached sprues are by said operators placed upon the vibrating grate of shake out 45 which functions to shake all sand therefrom in conventional manner; said sand being collected by underground conveyor 43 for return to the sand plant 37. While on this shake out 45 the sprues are knocked loose from the castings 10 which, having thus been freed of sand and the sprues, can be regarded as "finished." These finished castings then are moved from shake out 45 onto apron conveyor 340 which discharges them into container 341.

After thus having the castings 10 (and sprues) removed therefrom, the drag flasks 12 with sand still therein continue to move counterclockwise around track 32 from casting shake out 45 to the location of drag shake out 46 (upper right of Fig. 1). Here another operator uses an overhead hoist (not shown) to lift the drag flasks 12 from cars 33 on to shake out 46. By this shake out all sand is removed from those flasks which then are placed with their open sides down upon drag return track 161 via which they pass through the drag charging machine 160 and thence successively into the upper arms of assembling machine heads 60 progressively brought into register with Station I.

Each sand charged drag flask 12 thus received by the indexing machine 30 at Station I is moved on to Station II where a core 15 in a box 26 is added to the empty upper arm of the assembling machine head 60 stopping at Station II. In thereafter moving on to Station III the drag 12 and core box 26 are brought together and then turned over so that the core 15 rests in the mold cavity of the drag 12 upon arrival at Station III. Here the empty core box 26 is withdrawn from the assembling machine arm and automatically turned over for return via track 187 back to Station II.

In further progressing from Station III to Station IV the drag 12 with core 15 resting therein continues in the lower arm of the turret head 60. At Station IV there is inserted into the upper arm of the head a sand-charged cope 14. The flask of this cope 14 has previously passed through charging machine 240 after having been brought thereto along return track 241 from shake out 47; the transfer of each flask 14 from a poured mold carried by car 33 moving on track 32 already having been explained.

In further advancing from Station IV to Station V the arms of each head 60 close bringing the sand charged cope 14 together with the drag 14 over the core 15 resting therein. It is in this condition that the assembled mold 12—14 reaches Station V. Here it is withdrawn from the arms of turret head 60 and transferred (prior to the present invention by an operator using a powered hoist) to an empty car 33 approaching along the main track 32. There this assembled mold is poured as earlier described.

It will thus be seen that the installation of Fig. 1 makes successive re-use of each of the drag flasks 12 and of each of the core boxes 26 and of each of the cope flasks 14 which are utilized in carrying out the complete mold assembling cycle just outlined, and also re-uses all of the sand utilized to charge the cope and drag flasks and to form the cores 15. The aforesaid cycle is a continuous one and its employment not only raises the casting output obtainable within a given area of foundry floor space but it also cuts down both the time and the labor needed to prepare the mold components and assemble them into condition ready for pouring.

One commercially successful installation organized as shown by Fig. 1 is capable of preparing, assembling and pouring the molds at the high rate of 240 per hour; the assembly time for each mold thus being only fifteen seconds.

This means that once every fifteen seconds a sand charged drag 12 is inserted into the upper arm of the turret head 60 at Station I, a core box 26 with finished core 15 therein is inserted into the lower arm of the turret head 60 at Station II, an empty core box 26 is withdrawn from the upper arm of the rolled over head 60 at Station III and then turned over and placed upon track 187 for return to Station II, a sand charged cope 14 is inserted into the empty upper arm of the turret head 60 at Station IV, an assembled mold 12—14 is withdrawn from the closed arms of the turret head 60 at Station V and prepared for transfer to a car 33 moving around track 32, and an indexing movement (of 72°) is imparted to central machine 30's turret thereby advancing all five arm heads 60 to the next stations in the direction of turret rotation.

The speed of mold-car movement around main track 32 is selected so that the aforesaid fifteen seconds is required for each car 33 to pass a given point; this assuring coordinated supply of the drag flasks 12 to the shake out 46 which leads to Station I, of empty cars 33 to the location of Station V at which assembled molds are transferred to those cars for pouring, of cope flasks 14 (from the poured molds) to the shake out 47 which leads to Station IV, and of cooled castings 10 (from the drags 12 passing beneath core box track 187) to the shake out 45 which leads to the receiver 341 (via conveyor 340) for the finished castings.

The aforesaid operation has the advantage of being a "continuous" one by which rates of casting production of the high order indicated may be attained. But using only the original apparatus of Fig. 1 (without benefit of our present improvements) results in a requirement for operators at each of Stations I, II, IV and V (none at Station III); and an important object of the present invention is to replace the Station V operator by the automatic take-off and lowerator mechanism now to be described.

*The improvements added by present invention*

The improvements of our invention as depicted by the drawings hereof eliminate all need for an operator at Mold-Off Station V and they provide still further benefits later to become evident.

These improvements reside in: (*a*) manipulator mechanism at Station V including curved track 260' for automatically withdrawing the assembled molds from the central indexing machine 30 and successively turning them through 90° for delivery to a position over the outer mold car track 32; (*b*) lowerator mechanism shown generally at 385 organized to receive each so delivered mold and set it down upon an empty car 33 passing beneath the lowerator along the track 32; and (*c*) control facilities for coordinating operation of the manipulator 260' and the lowerator 385 with operation of the central mold assembling machine 30 and other portions of the complete installation depicted in Fig. 1.

*New manipulator for automatic mold take off*

As shown by Figs. 1, 7 and 10, the curved track 260' of the take-off manipulator spans the distance between the assembling machine arms 62—61 at Station V and the lowerator mechanism 385 over car track 32; in it there is space for four of the assembled molds 12—14 as represented in Fig. 7*a*; and between the two curved side supports 388 and 389 of this track there are mounted rows of rollers shown at 390—391 in Figs. 7–8 forming a floor throughout the entire span of the curved track's length.

Along the portion of track 260' that is directly adjacent to the central assembling machine arms 62—61 (see Fig. 8) these two roller rows 390—391 are separated by a central space through which there is free to travel a retractor carriage represented at 262' in each of Figs. 7 and 8. This carriage is supported on a pair of guide rods 393 (see Fig. 9) along which it is free to slide horizontally back and forth between said side roller rows 390 and 391.

Said back and forth movement on the part of retractor carriage 262' is produced by a cylinder 263' the shell of which is fixedly mounted on support member 394; the cylinder piston 265 being connected via rod 266 with a downward extension 267 of the retractor carriage 262'. Admission of pressure fluid into port 268 of cylinder 263' causes piston 265 to move carriage 262' to the eject position (to the left in Fig. 8 and towards the top of Fig. 7) here shown in full lines; similarly, admission of pressure fluid into port 269 effects movement of the carriage back (to the right in Fig. 8 and towards the bottom of Fig. 7) towards the arm head 60 of the assembling machine and into the position indicated by dotted lines. The mentioned pressure fluid for operating manipulator cylinder 263' is supplied thereto via the conduits shown at 268' and 269' in Fig. 24*b* under the control of a solenoid valve SV5 later to be described.

Protruding upwardly from the top of carriage 262' is a latch 272'. This latch is organized so that as the carriage 262' moves to the right in Fig. 8 the latch will slide under the assembled mold 12—14 in the arms 62—61 of the assembling machine and then rise up behind said mold as shown by the dotted lines in Fig. 8. Forward or eject movement of the carriage 262' (to the left in Fig. 8) now carries (via latch 272') the assembled mold out of the support-arm rollers 76 away from the assembling machine head and towards lowerator mechanism 385 along the curved delivery track 260'.

In this way each assembled mold 12—14 brought by a pair of assembling machine arms 62—61 to Station V is engaged by latch 272' when the carriage 262' is moved to the extreme right in Fig. 8, as there shown dotted. Admission of pressure fluid into port 268 now causes cylinder 263' to move the carriage 262' away from arm head 60 thereby transferring the assembled mold to the left in Fig. 8 and on to the curved track 260' represented in Fig. 7 as accommodating the four molds diagrammatically indicated in Fig. 7*a*.

To assist each so withdrawn mold in pushing the four molds there ahead along curved track 260', all of the mold drags 12 are equipped with bumpers 380 attached to the two ends thereof in the manner shown by Figs. 3, 4, 6 and 7*a*. Said bumpers 380 on the drag flask ends form the subject matter of a copending divisional application Serial No. 498,336 filed March 31, 1955, under title of "Foundry Mold Flasks with Novel End Bumper Means." In operation of our new manipulator apparatus these bumpers 380 contact one another as indicated by Fig. 7*a*, so that withdrawal movement imparted to each assembled mold 12—14 taken out of machine arms 62—61 by the manipulator carriage 262' (and latch 272') is transmitted to the four molds 12—14 already on curved track 260' thereahead with resultant advancement of the leading mold into the lowerator mechanism 385 over car track 32; guidance of the molds during such movement being imparted by track side supports 388 and 389 which extend above the level of rollers 390—391 as indicated by Figs. 8 and 10.

*Manipulator limit switches and stop latch*

In order that such advancement of a mold from the curved track 260' into the lowerator 385 can occur only in response to withdrawal by carriage 262' of an additional mold from the assembling machine arm head 60, it may be advisable to provide a stop latch 396 installed at the end of curved track 260' as shown in Figs. 7, 10 and 13. Included in this latch is a stop bar 397 which normally occupies the raised position shown by Figs. 12 and 24*b*, wherein the bar blocks advancement of an assembled mold 12—14 from the end of curved track 260' into the lowerator mechanism 385.

Serving to control stop latch 396 are the contacts of a limit switch N' actuated by the manipulator carriage 262' as shown by Fig. 8 and included in a circuit over which a latch solenoid 398 is at proper times energized from main supply conductors represented in Fig. 24*b* at 280 and 281. With the manipulator carriage 262' in the extreme left or "eject" position shown by Fig. 8, switch contacts N' are held open, the solenoid 398 is deenergized (see Fig. 24*b*), and bar 397 occupies the upward position to prevent an assembled mold 12—14 from passing into the lowerator 385 from the curved track 260'. But as soon as the manipulator carriage 262' moves to the right in Fig. 8 to pick up another assembled mold from machine arm head 60, switch contacts N' immediately close to energize solenoid 398 from conductor 280—281 and thereby draw stop bar 397 down to clear the path for advancement of an assembled mold into the lowerator.

In the illustrative arrangement represented such clearance continues during movement by carriage 262' to the extreme right in Fig. 8, and during subsequent return to the extreme left incident to pulling another assembled mold from machine head 60 onto curved track 260' and advancing all of the molds already on the track along the track thereby moving the forward mold over the withdrawn stop bar 397 and into the lowerator mechanism 385. Upon completition of such movement by return of carriage 261' to the extreme left in Fig. 8 the switch contacts N' are reopened (as shown by Figs. 24*b* and 8) to deenergize solenoid 398 and allow return of the stop bar 397 to the upward position shown in Figs. 12 and 13.

Further included in the mold take-off manipulator apparatus are an interlock switch shown at N'' in each of Figs. 8 and 24*b* plus a limit switch shown at O in the same views. These switches are of the "normally open" type represented in Figs. 8*a* and 8*b* and they respectively register arrival of carriage 262' at the extreme left position shown in solid lines by Fig. 8 and at the extreme right position shown dotted. The control functions performed by these two switches will later be described.

*Lowerator mechanism for placing assembled molds on cars*

Cooperating with the apparatus just described is our new lowerator mechanism 385 that serves first to receive each assembled mold 12—14 from the curved manipulator track 260' and then to set the received mold down upon an empty car 33 passing beneath the lowerator along the track 32.

In moving as aforesaid along the curved manipulator track 260' each of the assembled molds 12—14 remains at substantially the same elevation as when withdrawn from arms 62—61 of the assembling machine head 60 at Station V. Such elevation is substantially higher than the tops of cars 33 passing along track 32 beneath the lowerator; a rather clear idea of the elevation difference being given by each of Figs. 8 and 10. A significant function of mechanism 385 therefore is to lower each mold received from track 260' (see Figs. 7–7*a*) by the distance necessary to place the mold upon the top of a car 33.

In order more readily to receive the so placed mold, each of the mold cars 33 in the entire train on track 32 is provided with a pair of support bars 369 spacedly extending from front to rear of the car as shown in Figs. 8, 10, 13, 14, 15, 16, 17 and 23. The forward end of each of these support bars 369 is beveled as shown by Figs. 16 and 17. Protruding from the top of each bar near its front is a knuckle shown at 368 in each of the drawing views just named. As Figs. 16 and 17 indicate, the drag 12 of each mold set upon a car 33 rests upon support bars 369 and rides with its front inner edge abutting the knuckles 368.

The lowerator mechanism here illustrated at 385 utilizes an upright structure formed of four "I" beams 400 constituting the structure corners so indicated by Figs. 7, 10, 13, 14, 15, 16, 18, 19, 21, 22 and 23. The tops of these corner "I" beams are joined together by a pair of side beams 402 and by a pair of end beams 403, and across the two end beams there extends a top central member represented at 404 in each of Figs. 1, 10, 13, 14, 15 and 16.

Supported by and extending upwardly from this central member is a hydraulic cylinder 406 by which the lowerator is operated. The piston 407 of this cylinder is joined with the top of a rod 408 that extends into a coupling 409 joined with an extension rod 410 secured to the top of the lowerator carriage. Said carriage top is made up of end members 412 and cross members 413 interconnected as shown by the plan view of Fig. 18; and the carriage further comprises side guides 414 which move up and down along the guide rods 415 at the structure sides. These side guides 414 are rigidly joined with the carriage top 412—413 by means of juncture members shown at 416 in each of Figs. 13, 14, 15, 16, 18 and 19.

Up and down movement on the part of this lowerator carriage is produced by the aforesaid hydraulic cylinder 406. Admission of pressure fluid into port 418 of this cylinder causes piston 407 to move the carriage upwardly toward the top position shown by Figs. 10 and 13; said upward movement being arrested when the carriage top 412—413 contacts the outer frame top 402—403 as in Figs. 10 and 13. Similarly, admission of pressure fluid into port 419 (see Fig. 11) effects downward movement of the carriage towards the bottom position shown by Fig. 14; said downward movement being arrested when the carriage contacts stop member 420 as in Fig. 14.

The mentioned pressure fluid for operating lowerator cylinder 406 is supplied thereto via the conduits shown at 418' and 419' in Figs. 11 and 24*b* under the control of a solenoid valve SV9 and from suitable facilities diagrammed in Figs. 24*a*–24*b* as including a fluid pressure line 276 and a fluid exhaust line 277. Said solenoid valve SV9 may have the internal construction diagrammed by Figs. 11 and 25. The valve stem there designated 114' is by energization of the solenoid shown at the left of the diagram withdrawn to the left as represented where it remains even after the left solenoid is deenergized; but upon energization of the right solenoid (with the left winding deenergized) the stem 114' is drawn to the right where it remains until the left winding is again energized (with the right winding deenergized).

With the stem at the left (Fig. 11) pressure fluid from line 276 flows as indicated by the small arrows out of the valve casing through the "first" port at the top left thereof to enter port 419 of lowerator cylinder 406 and thereby move piston 407 downwardly; the "second" port at the top right of Fig. 11 now being in communication with exhaust line 277. When, however, the valve stem 114' is shifted to the right, pressure fluid from line 276 flows out of the valve casing through the top right or "second" port to enter port 418 of lowerator cylinder 406 and thereby moves piston 407 upwardly; the top left or "first" port now being placed in communication with exhaust line 277. In this way up and down movements of the lowerator carriage are produced and controlled.

*The mold-carrying rollers in lowerator carriage*

In the arrangement shown each assembled mold 12—14 entering the lowerator 385 is received by the carriage thereof when in the uppermost position of Figs. 10 and 14; the left and right side bars 28 of the mold drag 12 then riding on the tops of left and right rows of rollers 421 carried by left and right support leaves 422 each of which is attached to the carriage top 412—413 via the hinge connection shown at 423 in Figs. 10, 13, 14, 15, 16 and 19. It will be noted that there are five rollers 421 in each of these left and right side rows; also that these rollers are mounted to give a slight downward inclination in the direction of mold entry into the lowerator carriage.

By reason of such inclination each assembled mold 12—14 entering the lowerator carriage from the manipulator track 260' moves forwardly along the tops of rollers 421 to the central position shown by Fig. 10 wherein the mold is arrested upon contact by the forward edge of its drag 12 with a stop member 425 carried by the right support leaf 422 as indicated in Figs. 10, 13, 14, 15 and 21. In cooperation with the aforesaid inclination of roller rows 421 this stop member 425 holds each received mold in said central position during subsequent lowering of the mechanism carriage.

Such lowering moves the received mold downwardly to the position shown by Fig. 14 wherein the supporting rollers 421 have intermeshed between cooperating left and right rows of other rollers 426 at the lowerator bottom in the manner best indicated by Figs. 7, 10 and 16. Each of these bottom rows is made up of four of the rollers 426 mounted on stationary side brackets 427 to give a slight inclination opposite to that of the carriage roller rows 421; this bottom-row inclination being downwardly in the direction of movement by cars 33 beneath the lowerator mechanism. Under certain circumstances it may be desirable that alternate rollers 426 in these two bottom rows be of square rather than round shape to slightly resist movement of the drag side bars 28 thereover (see Fig. 16) for a purpose later to be made evident.

As the lowerator carriage reaches its lowermost position of Fig. 14, the mold 12—14 carried by the rollers 421 on side leaves 422 has its drag side bars 28 transferred to the bottom stationary rollers 426 with resultant change in mold inclination from that represented by the central portion of Fig. 10 to that represented by Fig. 16 (and also by the lower portion of Fig. 10). From Fig. 14 it will be noted that when the carriage rollers 421 are in their lowermost position they clear the top of mold car 33 with the forward bottom edge of drag 12 resting on car support bars 369 and the trailing portions of the mold drag resting upon stationary bottom rollers 426 as shown in Fig. 16; those bottom rollers 426 likewise clearing the mold car tops 33 as also shown by Figs. 13 and 15.

Once the assembled mold 12—14 has been so delivered upon the lower roller rows 426 as shown in Figs. 14 and 16, the support leaves 422 of the carriage are spread apart to the position shown by Fig. 15 wherein the carriage rollers 421 have been moved fully away from the drag side bars 28. Such spreading is accomplished by a hydraulic cylinder shown at 429 in each of Figs. 13, 14, 15 and 19; positioning of this cylinder's piston 430 being governed by a solenoid valve SV10 connected with the two cylinder ports via the flexible conduits shown at 431 and 432 in each of Figs. 13, 14, 15 and 24*b*.

Admission of pressure fluid into cylinder 429 through conduit 431 holds the roller support leaves 422 in the closed position of Figs. 13 and 14 against inner stop nuts 433 of restraining bolts 434; while admission of pressure fluid through conduit 432 moves the support leaves 422 for rollers 421 to the aforementioned spread position of Fig. 15 against outer stop nuts 435 of the restraining bolts 434.

*Control of spread and closure of lowerator rollers*

With the carriage rollers 421 so spread (Fig. 15) and with the lowerator carriage still in its lowermost position (Fig. 14), the left support leaf 422 engages a normally open limit switch 437 to initiate upward movement on the part of the carriage by actuating control valve SV9 over the circuits shown by Fig. 24*b* and to be described presently. This upward movement continues in the manner indicated by Fig. 15 with the rollers 421 spread apart as there shown. This spreading is maintained until the carriage has aproached its top position with some such closeness as Fig. 16 represents. At this point in the upward travel an extension 438 from the carriage engages normally open limit switch 439 (see Figs. 10 and 16) which acts upon solenoid valve SV10 in the manner indicated by Fig. 24*b* to cause cylinder 429 to reclose support leaves 422 and thereby position carriage rollers 421 for reception of another assembled mold.

Once reclosed in this manner the rollers 421 so continue during further upward movement by carriage 412—413 to the extreme top position represented by Figs. 10 and 13; also thereafter during reception of another assembled mold 12—14 (see Fig. 10) as well as during subsequent lowering of the carriage to the extreme downward position of Fig. 14 wherein the mold is delivered upon the lower roller rows 426 as indicated by Fig. 16.

*Limit switches for governing up and down carriage travel*

When the carriage 412—413 reaches said extreme downward position of Fig. 14, projection 438 thereof has the position shown dotted in Fig. 16 and effects closure of normally open limit switch 440. Through the control circuits of Fig. 24*b* the so closed switch 440 acts upon solenoid valve SV10 in a way causing cylinder 429 to open support leaves 422 to the spread position of Fig. 15 wherein carriage rollers 421 are fully disengaged from the side bars 28 of the assembled mold 12—14 now resting on the lowerator's bottom rollers 426 (see also Fig. 16).

As already seen, this spreading of the support leaves 422 is registered by limit switch 437 (Figs. 14–15) which through the Fig. 24*b* control circuits acts upon solenoid valve SV9 to initiate upward movement of the lowerator carriage. Once initiated this upward movement (produced by hydraulic cylinder 406) continues until the carriage 412—413 has been fully returned to the uppermost position of Figs. 10 and 13. On the way up carriage projection 438 engages limit switch 439 (as indicated by Fig. 16) to reclose support leaves 422 and thus prepare rollers 421 for reception of another mold (as previously explained).

Upon arrival of the carriage 412—413 in its uppermost position projection 438 engages a third limit switch shown at 442 in Fig. 10. This third switch likewise is of the normally-open type (see Fig. 16) and said engagement (Fig. 10) closes the switch contacts 442 to set up for solenoid valve SV9 a control circuit represented in Fig. 24*b* as also including the normally-open contact 445 of a "mold-in" electric eye device shown by Fig. 21 and later to be described. This electric eye contact 445 closes only after an assembled mold 12—14 has fully entered the lowerator carriage on rollers 421 (see Fig. 21 where such entry is nearly complete), when the Fig. 24*b* circuit including contacts 442 and 445 is completed to act on valve SV9 in a way causing hydraulic cylinder 406 to lower the carriage 412—413 with the newly-received assembled mold 12—14 therein; all in a manner more fully to be described.

*The electric eye control devices*

Our complete lowerator mechanism 385 includes not only the "mold-in" electric eye just mentioned as utilizing contact 445, but also the four other similar electric eye control devices which respectively utilize contacts 444, 446, 447 and 448—449 in the manner shown by Figs. 21, 22 and 23.

Each of these five devices comprises a light source L that directs a light beam B into a photocell C which through an amplifier A causes a relay R to hold its contact (444, 445, 446, 447 or 448—449) in one position when the light beam reaches the photocell and in another position when the light beam fails to reach the photocell. In the case of control device L1—C1—R1, contact 444 is released under the represented condition wherein beam B1 is blocked by an assembled mold 12—14; but when this mold is taken out of the beam path allowing the light to reach cell C1, that cell will through amplifier A1 cause relay R1 to move contact 444 to the picked up position.

Likewise, in the case of device L2—R2, the shining of light beam B2 upon cell C2 holds contact 445 picked up; but when mold 12—14 moves further forward to interrupt the beam relay R2 will release contact 445. Comparable operation takes place on the part of each of the remaining electric eye devices L3—R3, L3—R4 and L5—R5.

Looking more closely at the first or "mold-entry" electric eye shown at L1—C1 in Figs. 10, 16 and 21, it directs its beam B1 across the lowerator at an elevation slightly above the curved mold track 260′ so as to register movement of each assembled mold 12—14 from that track into the lowerator carriage upon the receiving rollers 421 thereof. The normally picked up contact 444 of this device thus releases upon entry of each assembled mold into the lowerator and performs control functions later to be explained by reference to the diagram of Fig. 24*b*.

The second or "mold-fully-in" electric eye L2—C2 (again see Figs. 10, 16, 21) is mounted at the same elevation as the first, but differs therefrom in registering full entry of each assembled mold into the lowerator carriage; i. e., normally picked up contact 445 is released whenever a mold on carriage rollers 421 goes fully forward (see Fig. 21) into abutment with stop member 425. Such release of contact 445 energizes the left winding 450 of solenoid SV9 to initiate downward movement of the lowerator carriage 412—413; Fig. 24*b* showing the energizing circuit to include contact 445 plus limit switch contacts 442 (closed only when the carriage is in its uppermost position) plus conductor 451 plus contact 448 of "mold-out" electric eye device L5—C5 whose function will be explained presently.

The third and fourth or "mold-lowered" electric eyes L3—C3 and L4—C4 shown by Figs. 10, 16 and 22 direct their beams B3 and B4 across the lowerator at an elevation below that of the first two eyes but still high enough to be blocked by the drag 12 (see Fig. 10) of each mold entering the carriage on rollers 421. This blocking releases contacts 446—447 and continues until the mold has been lowered almost all of the way down, when the top of the mold cope 14 passes below the level of photocells C3 and C4 (see Fig. 16) allowing beams B3 and B4 to reach those cells and pick up contacts 446 and 447.

Such pick up indicates vacancy of the lowerator's upper compartment by reason of the assembled mold 12—14 last to enter from curved take-off track 260′ (due to manipulator cylinder 263's withdrawing a newly assembled mold from the central machine 30 and pushing there ahead the four molds already on track 260′—see Fig. 7) having been lowered by carriage 412—413 very nearly to the bottom rollers 426.

In the control diagram of Fig. 24*b* the aforesaid indication by contacts 446—447 is utilized to set up the circuit represented as including conductor 252 via which the left winding 300 of solenoid valve SV5 is energized over limit switch O in order to cause manipulator cylinder 263′ (Fig. 8) to withdraw another assembled mold 12—14 out of machine arms 62—61 at Station V and on to the curved take-off track 260′. As will be apparent from Fig. 24*b*, either one of the two contacts 446—447 and associated electric eyes acting alone is sufficient to perform the function stated; but the two connected in series are of course equally satisfactory to register the aforesaid vacancy of the lowerator's upper compartment.

The fifth or "mold-out" electric eye shown at L5—C5 in Figs. 10, 16 and 23 registers vacancy of the lowerator mechanism's lower compartment and utilizes a light beam B5 directed diagonally thereacross. As long as an assembled mold rests on lower rollers 426 anywhere within the confines of the lowerator framework, the cope 14 thereof blocks transmission of this light beam B5 to photocell C5 thereby allowing contacts 448 and 449 to stay released. This blockage continues until a car 33 traveling on track 32 has carried the assembled mold completely out of the lowerator and past the position shown by full lines in Fig. 23.

The light beam B5 then gets through to photocell C5 and via amplifier A5 causes relay R5 to pick up contacts 448 and 449. In the control diagram of Fig. 24*b* such pick up by contact 448 (in response to each emptying of the lowerator's lower compartment) cooperates with the "mold-fully-in" electric eye contact 445 and the "carriage-up" limit switch 442 in initiating downward movement of the lowerator carriage 412—413 by energizing the left winding 450 of solenoid valve SV9 in the manner earlier explained.

In also picking up at the same time the companion contact 449 of electric eye L5—C5 energizes the timer shown at 454 in Fig. 24*b*. After a delay of several seconds (adjustable as will later be explained) this timer opens its contact 445 to initiate stoppage of the motor 35′ by which the mold cars 33 are driven (see Fig. 1) around the outer track 32; the purpose of such stoppage being to prevent empty cars 33 from passing through the lowerator mechanism when assembled molds are not being placed on those cars.

*Control of motor 35′ that drives mold cars*

It already has been seen that the motor shown at 35′ in each of Figs. 1, 20 and 24*b* drives the mechanism 35 and advances all of the mold cars 33 of the represented train slowly around the installation's outer track 32; the direction of such advancement being counterclockwise (as shown by the arrows of Fig. 1) and the speed of car movement being selected by an adjuster apparatus 456 from about nine to twenty-four feet per minute, with a car speed of about fourteen feet per minute being typical.

In the organization shown by Fig. 24*b* energizing current for driving motor 35′ is supplied thereto over contact 457 of a relay RD (also shown in Fig. 20); such supply being from any suitable source of power. Relay RD picks up said contact 457 to energize the motor whenever the relay winding is connected across supply conductors 280—281; such connection being effected over contact 458 of a second relay RS and either the aforementioned timer contact 455 or a master switch MS when shifted to "manual" position (from "automatic" as represented).

When it is desired to place motor 35′ in operation a "start" push button 460 is depressed to energize the RS relay winding over a circuit shown as including a "stop" push button 461 together with a number of "emergency stop" push buttons ES. Such energization causes relay RS to pick up contact 458, along with a second or "stick" contact 459 that bridges push button 460 and thus continues energization of the relay after "start" button has reopened. Picked up contact 458 now energizes relay RD (over the circuit earlier named) causing pick up of contact 457 and connection of motor 35′ with its power source, with resultant driving of the mold cars 33 around track 32 (see Figs. 1 and 20).

Such connection and accompanying driving can be stopped: (*a*) by depressing "stop" push button 461 to deactivate relay RS with resultant opening of relay RD's contact 457 in the motor power circuit; or (*b*) by depressing one of the "emergency stop" push buttons ES placed at various locations in the complete mold assembling installation shown by Fig. 1; or (*c*) by an opening of the timer contact 455, as occurs when the lowerator 385 at Station V fails to deliver assembled molds 12—14 at a rate sufficiently fast to keep all of the approaching empty cars 33 filled therewith as the motor 35′ drives those cars along track 32 beneath the lowerator.

*Other apparatus comprised by control system of Figs. 24a—24b*

Fig. 24*a* constitutes a reproduction of Fig. 59 of the aforesaid earlier Northington-Lasater application Serial No. 200,899, filed December 15, 1950, an "Apparatus and Technique for Assembling Foundry Molds"; Fig. 24*a* hereof differing from said earlier case Fig. 59 by omitting the Station V control devices SV5, 263, L, M, N, O (the equivalents of which are reproduced in modified form by Fig. 24*b* hereof).

Fig. 24*a* hereof thus repeats from the earlier case Fig. 59 the seven solenoid valves SV1, SV2, SV3, SV4, SV6, SV7 and SV8 (each having internal construction shown by Fig. 25 hereof) plus the main drive cylinder 82 for indexing the central assembling machine 30 plus the drag carriage cylinder 171 at Station I plus the core carriage cylinder 200 at Station II plus the core box manipulator 220 and turn over motors 211—212 at Station III plus the cope carriage cylinder 250 at Station IV plus the turret stop cylinder 92 for the central machine plus limit and interlock switches A, B, C, D, E, F, G, H, J, K, P, Q, R, S, T, U, Y, W, X plus the timer 321 for turret indexing control plus the system relays RA and RB plus the switch 278 through which control potential is impressed between conductors 280 and 281 plus conductors 293 and 296 associated with relay contacts 283 and 284 plus interlock conductors 306 and 315 together with interlock break and interlock short out switches 307 and 308 plus the earlier mentioned fluid pressure and exhaust lines 276 and 277.

Supplementing these previously known control facilities of Fig. 24*a* are the newly added facilities here shown by Fig. 24*b*; the top of latter diagram constituting a continuation of the bottom of the former with common elements of the two drawing sheets having the same reference character applied thereto. For example, the electrical control circuits for both drawing sheets are energized through the aforementioned switch 278 which when closed connects main supply conductors with any suitable power source, such as a commercial 110 volt lighting circuit. In the description which follows it will be assumed there is in this way made available between control conductors 280—281 a substantially constant electrical potential of about 110 volts.

The Fig. 24*b* control facilities for our new mold take-off and lowerator apparatus have already been explained in a general way as to substantially all components except the "interlock" relay shown at RK in Fig. 24*b*.

This relay RK is provided with two contacts 463 and 464. Contact 463 communicates with the interlock circuit of Fig. 24*a* via conductors 465 and 466; and it breaks the interlock circuit (including conductors 306 and 315) at all times except when the winding of relay RK is energized, when contact 463 picks up to establish connection between the two interlock conductors shown at 306 and 315 in Fig. 24*a*.

Energization of this interlock relay RK is governed by the earlier described "mold-entry" electric eye contact 444. With interlock switch N″ closed by mold-off carriage cylinder 263′ (Fig. 8), closure of electric eye contact 444 energizes the relay RK winding over a circuit shown as including conductor 467; and such energization causes both of the relay contacts 463 and 464 to pick up.

Picked up contact 464 now bridges the electric eye contact 444 and thus performs the "stick" function of keeping relay RK energized even after the electric eye contact 444 has re-opened (in response to lowering of a mold previously received in the lowerator carriage). Under this condition relay RK continues to stay picked up until the mold-off cylinder 263′ at Station V opens interlock switch N″ in preparing to withdraw another assembled mold from the central indexing machine 30.

*Operation of mold take off and lowerator in complete Fig. 1 system*

How the complete mold assembling system incorporating our improvements operates will have become more or less apparent from the foregoing description of the various component devices and parts which make up that system. It is first of all to be observed that the fundamental functions of mold assembly and casting production are little changed from those performed by the facilities of Fig. 1 as disclosed by earlier Northington-Lasater application Serial No. 200,899 earlier referred to.

But by reason of the automatic take-off lowerator improvements of the present invention certain limitations have been removed from said earlier system operation and certain advantages have been secured therefor.

It has already been pointed out that in the original system of Northington-Lasater application Serial No. 200,899 the services of an operator at Station V were required to manipulate a power hoist by which the assembled molds 12—14 were lifted from track 260 and placed upon empty cars 33 on track 32 for advancement past Station V into the pouring area.

With the new take-off and lowerator facilities here added, all need for such operator at Station V is dispensed with; that previously required operator being fully replaced by our automatic take-off and lowerator apparatus already described as to structural organization and the operation of which will now be considered in its relation to other portions of the complete system.

In an earlier specification section entitled "Operation of Fig. 1 Installation before Improved as per Present Invention" it has been pointed out that one commercially successful installation is (in conjunction with the improvements hereof) capable of preparing, assembling and pouring the molds at the high rate of 240 per hour; the assembly time for each mold thus being only fifteen seconds.

It is there pointed out that once every fifteen seconds a sand charged drag 12 is inserted into the upper arm of turret head 60 at Station I, a core box 26 with finished core 15 therein is inserted into the lower arm of the turret head 60 at Station II, an empty core box 26 is withdrawn from the upper arm of the rolled over head 60 at Station III and then turned over and placed upon track 187 for return to Station II, a sand charged cope 14 is inserted into the empty upper arm of the turret head 60 at Station IV, an assembled mold 12—14 is withdrawn from the closed arms 62—61 of turret head at Station V for transfer to a car 33 moving around track 32, as an indexing movement (of 72°) is imparted to central machine 30's turret thereby advancing all five arm heads 60 to the next stations in the direction of turret rotation.

It further has been pointed out that the speed of mold-car movement around track 32 is selected (via adjuster device 456) so that the aforesaid fifteen seconds is required for each car 33 to pass a given point; this assuring coordinated supply of the drag flasks 12 to the shake out 46 which leads to Station I, of empty cars 33 to the lowerator 385 near Station V by which lowerator assembled molds 12—14 are transferred to those cars for pouring, of cope flasks 14 (from the poured molds) to shake out 47 which leads to Stations IV, and of cooled castings 10 (from the drags 12 passing beneath core box track 187) to the shake out 45 which leads to the receiver 341 (via conveyor 340) for the finished castings.

Once every fifteen seconds therefore the manipulator carriage 262' of Fig. 8 contracts to the right causing latch 272' to engage an assembled mold newly delivered to Station V by an arm head 60 of the central assembling machine 30. Assuming that the lowerator carriage 412—413 is in the uppermost position shown by Figs. 10 and 13 and assuming that the upper compartment of the lowerator 385 is vacant, light beams B3 and B4 (Fig. 22) both reach cells C3 and C4 thereby holding contacts 446 and 447 picked up as shown by Fig. 24*b*.

The aforesaid engagement of manipulator latch 272' behind a mold in the assembling machine arms (shown dotted by Fig. 8) is accompanied by a closing of limit switch O which now energizes the left winding 300 of solenoid valve SV5 over conductor 252. Valve SV5 thereupon admits pressure fluid from line 276 through conduit 268' into the right port 268 of manipulator cylinder 263'. Such admission forces piston 265 (Fig. 8) to the left causing carriage 262' to pull (via latch 272') the engaged mold 12—14 out of the central machine arms 61—62. While the side bars 28 of the mold drag 12 rest on the rollers 76 of the lower arm 61, the bottom of the mold drag is withdrawn upon the tops of rollers 390—391 of the curved take off track 260' (see also Fig. 7).

The stop latch 396 has its bar 397 drawn downwardly during this operation by reason of limit switch N' having been closed when the manipulator carriage of Fig. 8 first started to move to the right at the beginning of the take-off cycle. In bringing another assembled mold 12—14 upon the curved take off track 260' the manipulator carriage 262' thus pushes ahead of the new mold the four previously assembled molds 12—14 that are already on track 260'. In consequence the leading mold on that track (see Figs. 7–7*a*) is now moved from the exit end of track 260' into the empty carriage of lowerator 385. During this movement the weight of the mold previously carried by rollers 390—391 of track 260' is transferred to inclined roller rows 421 of carriage 412—413, upon which rollers 421 there rest the side bars 28 of the inserted molds' drag 12 as indicated by Figs. 10 and 13.

The aforesaid withdrawal of a new mold 12—14 from the central assembling machine and accompanying insertion of the fourth mold 12—14 thereahead into the lowerator carriage 412—413 is followed by a raising of stop latch bar 397 to the mold blocking position. This latch raising is accomplished by closure of switch contacts N' when the manipulator cylinder 263' brings carriage 262' to the extreme right position represented by full lines in Fig. 8.

Meanwhile the leading mold 12—14 rolls forward on rollers 421 in the lowerator carriage until it is stopped by member 425. In so blocking light beam B2 (see Fig. 21) this entering mold causes photo cell C2 to release contact 445. From Fig. 24*b* it will be seen that such release energizes the left winding 450 of solenoid SV9 over conductor 451 and closed limit switch 442.

Valve SV9 now admits pressure fluid through conduit 419' into the top port (see Fig. 11) 419 of the lowerator cylinder 406. Such admission causes cylinder piston 407 to move lowerator carriage 412—413 downwardly carrying the assembled mold down upon the lower stationary rollers 426 as shown by Fig. 14. Such lowering movement can take place only when the lower compartment of the lowerator is vacant; under which condition light beam B5 (see Fig. 23) reaches photo cell C5 to hold picked up contact 448 that is in the energizing circuit shown by Fig. 24*b* of solenoid valve winding 450. Were a previously delivered mold 12—14 still to be within the lower compartment of the lowerator contact 448 would be open and prevent the aforesaid lowering of the new mold 12—14.

At the bottom of its lowering stroke the carriage 412—413 engages (via projection 438) limit switch 440 (see Figs. 10 and 16) and thereby completes an energizing circuit for the left winding 470 of solenoid valve SV10; Fig. 24*b* showing such circuit to include a conductor 471. Valve SV10 now admits pressure fluid through conduit 432 into the rear port of the release cylinder shown at 429 in Figs. 13, 14 and 15. Such admission causes piston 430 to spread support leaves 422 and thereby move the two rows of carriage rollers 221 from beneath the mold drag side bars 28 now resting upon the lower stationary rollers 426 as shown by Figs. 15 and 16; such spread position for rollers 421 being as indicated by Fig. 15.

In arriving at this spread position the left support leaf 422 engages limit switch 437 (see Fig. 14) and having closed the contacts thereof completes for the right winding 472 of solenoid valve SV9 the energizing circuit shown by Fig. 24*b* as including conductor 473. Valve SV9 now admits through conduit 418' pressure fluid into the lower port 418 (see Fig. 11) of the lowerator cylinder 406, thus causing that cylinder to start upward movement on the part of carriage 412—413.

This upward movement continues through the progressive stages indicated by Figs. 15 and 16. In approaching the top of its upward stroke (Fig. 16) carriage projection 438 engages limit switch 439; such engagement closes switch 439 to complete for the right winding 474 of valve SV10 the energizing circuit shown by Fig. 24*b* as including conductor 475; and such completion causes said valve to admit through conduit 431 pressure fluid into the forward port of release cylinder 429. Such admission causes cylinder piston 430 to return support leaves 422 and carriage rollers 421 to the closed position of Fig. 13 wherein the rollers 421 are in readiness for reception of another assembled mold from curved take off track 260'.

Upon attainment of its fully raised position of Figs. 10 and 13 the carriage 412—413 engages (via projection 438) limit switch 442 and by closing same reconditions the lowerator and take off apparatus for repeating another cycle of mold withdrawal from the central assembling machine and delivery via lowerator 385 upon an empty car 33 passing along track 32 beneath the lowerator carriage 412—413.

But before such repeated cycle can start itself the previously lowered mold 12—14 must have been carried by a car 33 fully out from under the lowerator structure 385; the latter safeguard being provided via electrical eye control device L5—C5 which projects light beam B5 diagonally across the bottom lowerator compartment in the manner indicated by Fig. 23.

In moving through said bottom compartment the mold cars 33 have such elevation with respect to stationary roller rows 426 that an assembled mold 12—14 resting on those rollers 426 as indicated by Figs. 15 and 16 has its forward bottom edge at substantially the same elevation as the top of car support bars 369 (see also Fig. 17). In consequence the knuckles 368 on an empty car advancing beneath a so-supported mold 12—14 (see right portion of Fig. 16) will engage with the inner forward edge of the mold drag frame 12 and thereby pull the assembled mold along with the car as indicated by the full line representation of Fig. 17 and of the left portion of Fig. 16.

In this way each assembled mold delivered upon lowerator rollers 426 is transferred to a moving car 33; such transfer being accomplished by a progressive lowering of the rear bottom edge of the mold as the car draws the mold (via knuckles 368) along rollers 426 into the position shown by the left of Fig. 16 wherein both the rear and front edges of the mold frame 12 rest upon the tops of the support bars 369.

Incident to such transfer upon the car it may prove desirable to form alternate rollers 426 in the two lower rows of square or other flattened contour (not shown) which prevents those rollers from turning and instead requires that the mold side bars 28 resting thereon slide along the flattened surfaces. Such sliding introduces resistance to mold movement to assure that the aforesaid roller rows 426 will not cause the supported mold to roll forward of its own accord before the mold car knuckles 368 effect the engagement described immediately above.

The earlier mentioned electric eye L5—C5 (Fig. 23) is organized to not only prevent lowering of a new mold when a previously delivered one rests upon car 33 still within the confines of the lowerator mechanism 385, but it also is arranged to permit continuous movement of the mold car train along the track 32 as long as the newly assembled molds are delivered into the lowerator at a rate sufficiently fast to keep filled all of the cars 33 which pass along track 32 beneath the lowerator mechanism.

Participating in accomplishment of the latter function is the timer shown at 454 in Fig. 24*b* as being controlled by electric eye contact 449 of Fig. 23.

The car drive motor 35′, having been started by a depression of push button 460, continues in operation uninterruptedly as long as relay RD holds contact 457 picked up. With switch MS in the "automatic" position represented, such holding is maintained as long as contact 455 of timer 454 stays closed.

It already has been seen that timer 454 will open contact 455 only if electric eye contact 449 stays picked up for more than the several second period for which the timer is set. Thus even though the electric eye shown by Fig. 23 allows light beam B5 to reach photo cell C5 following each movement of an assembled mold 12—14 out of the lowerator 385, the car drive motor 35′ will stay in continuous operation if within the delay period for timer 454 there is delivered upon the bottom lowerator rolls 426 another assembled mold which again blocks the light beam B5 and returns contact 449 to the released position before timer contact 455 has opened.

Looking again at Fig. 23, the mold 12—14 will be carried by the moving car 33 from the position shown by full lines to the further advanced position shown by dotted lines during the period required by the timer 454 to open its contact 455 following energization over electric eye contact 449; and during normal operation of the system the lowerator 385 will receive and deliver another assembled mold 12—14 upon bottom rollers 426 before the previously delivered mold has reached the dotted line position of Fig. 23.

This means that the mold car drive motor 35′ will continue in uninterrupted operation and will be stopped only in the event that the lowerator 385 fails to deliver a succeeding mold 12—14 upon an incoming empty car 33 before the mold carried by the car 33 just ahead has reached the dotted line position of Fig. 23.

Obviously the delay period required on the part of timer 454 to achieve the above can best be set by trial and error. In practice a delay period of the order of several seconds is found to prove satisfactory. Should, moreover, the car train on track 22 be stopped by the aforesaid opening of timer contact 455, subsequent reclosure of that contact resulting from placement by lowerator 385 of another mold 12—14 upon bottom rollers 426 in the path of light beam B5 (see Fig. 23) will automatically reenergize drive motor 35′ (see Fig. 24*b*) and restart the mold car train.

Once each mold 12—14 delivered upon an empty car 33 has been carried by that car out of the lowerator 385 and past the full line position shown by Fig. 23, electric eye device L5—C5 picks up contacts 448—449 in the manner aforesaid and conditions (see Fig. 24*b*) valve SV9 and cylinder 406 for delivering upon the bottom rollers 426 another assembled mold 12—14 as soon as the same has fully entered into the raised carriage 412—413 and effected closure (via device L2—C2) of contact 445 of Figs. 21 and 24*b*.

In entering the lowerator carriage the incoming mold 12—14 first breaks light beam B1 (again see Fig. 21) and by closing contact 444 effects pick up of the "stick" relay shown at RK in Fig. 24*b*; this pick up being effected over conductor 467 and interlock switch N″ closed when the manipulator 263′ is in the fully extended position shown by Fig. 8. Under this condition contact 463 of relay RK sets up the interlock circuit 306—315 of Fig. 24*a* by joining conductors 465—466 of Fig. 24*b*; said circuit set up thus established by electric eye contact 444 continuing until the mold take off cylinder 265′ (Fig. 8) starts back to pick up another assembled mold from machine head 60 at Station V, this action opening interlock switch N″ and releasing relay RK to break the interlock circuit at contact 463.

In the aforesaid earlier Northington-Lasater application Serial No. 200,899 it is brought out that indexing rotation of central assembling machine 30's turret (upon which the five arm heads 60 are mounted as shown in Fig. 1) is effected by energizing the left winding 294 of solenoid valve SV1 (see Fig. 24*a* hereof); that the circuit for accomplishing said energization is set up by contact 284 of relay RB, which when picked up connects conductor 296 with the first supply conductor 280; and that when once so set up said circuit can be completed only when all of the various interlock switches at the five stations (D—E at I, F—G at II, W at III, S—J at IV, corresponding contacts at V, and P at stop cylinder 92 beneath the turret) are closed to connect conductor 315 of Fig. 24*a* with the second supply conductor 281 via conductor 316.

In the improved system here shown the interlock contacts at Station V so required to be closed are 463 of relay RK (Fig. 24*b*) governed by mold-off carriage switch N″ (Fig. 8) and electric eye 444 (Fig. 21) as already described.

It will thus be seen that such connection and accompanying energization of winding 294 of indexing control valve SV1 is accomplished only when the apparatus at each of the five Stations I—II—III—IV—V has fully completed its preparation for a subsequent indexing of the assembling machine turret; and a failure by any one of the five stations to complete full preparation for indexing serves to delay said energization even though all other parts of the installation are ready and waiting. But once everything is in full readiness the interlock circuit (right of Fig. 24*a*) supplies SV1 winding 294 with energizing current that shifts the stem of valve SV1 to the left admitting pressure fluid via conduit 89' into port 89 of indexing cylinder 82 (lower portion of Fig. 24*a*) and causing clockwise rotation of the central assembling machine turret (by which the five arm heads 60 of Fig. 1 are carried) through an additional 72°.

Completion of such turret indexing is accompanied by closure of limit switch A identified with indexing drive cylinder 82 as shown in Fig. 24*a*. This contact A closure picks up relay RA over conductor 320 thereby closing contact 283 and connecting conductor 293 with the first supply conductor 280. In consequence current is now supplied to the right winding of each of the solenoid valves shown at SV1, SV2, SV3, SV4 and SV7 in Fig. 24*a* with the results described by earlier Northington-Lasater application Serial 200,899.

At the same time the now energized conductor 293 supplies current to the right winding 478 of solenoid valve SV5 over a circuit shown in Fig. 24*b* as also including conductor 479. Valve SV5 now admits pressure fluid through conduit 269' to the left port 269 (Fig. 8) of manipulator cylinder 263'. Such admission causes piston 265 to move manipulator carriage 262' to the right (in Fig. 8) for the purpose of engaging latch 272' behind the assembled mold 12—14 just brought to Station V by the turret indexing action referred to above.

In this way there is started another cycle of mold withdrawal and lowering operations duplicating the one already described in detail above. Since this repeated cycle is exactly the same as the first, no attempt will here be made to detail the various individual actions constituting such second cycle; it being sufficient to say that these actions duplicate the first-cycle actions already described.

The automatic take off and lowerator apparatus of our invention thus functions to withdraw from the central assembling machine 30 the assembled molds 12—14 which are successively brought by that machine to Station V; it further functions to advance each so withdrawn mold along track 260' and thence into the lowerator mechanism 385; and it still further functions to deliver each such mold on to an empty car 33 passing along track 32 beneath said lowerator apparatus 385. Moreover, our disclosed novel arrangement permits the train of mold cars 33 to advance continuously around track 32 as long as the foregoing operations proceed with sufficient promptness as to keep all of the moving mold cars 33 filled with assembled molds; however, in case of a delay in the last named operation the timer 454 (Fig. 24*b*) acting in conjunction with electric eye L5—C5 (Fig. 23) will deenergize car drive motor 35' and by stopping mold car train movement thereby prevent any of the cars 33 passing beneath lowerator 385 from remaining vacant.

As each assembled mold 12—14 is thus carried by a car 33 from beneath lowerator 385 (as shown by full lines by Fig. 16) the two clamps shown at 19 in Figs. 4 and 5 are placed over the lug pairs 20 on the two mold ends for the purpose of firmly securing the mold cope 14 upon the top of the mold drag 12.

With the mold parts thus secured together each of the assembled molds travels on its car 33 past Station V (to the left in Fig. 1) into the pouring area where molten metal is poured into the mold in the same manner as in the original system of earlier Northington-Lasater application Serial No. 200,899.

*More extended systems likewise benefited by this invention*

In the installation represented by Fig. 1 such pouring of each asesmbled mold 12—14 is accomplished long enough before the carrying car 33 comes opposite cope shake out 47 to allow the molten iron to solidify sufficiently to permit removal of the end clamps 19 (see Figs. 3—4—5) and lifting of the thus-freed cope 14 away from the drag 12; such lifting being accomplished by the aid of a powered hoist (not shown) that is run by an operator who manually places each lifted cope 14 upon the cope shake out 47 leading (via return track 241) to cope charging machine 240.

If desired this Fig. 1 installation may be supplemented by cooling loop and cope stripper facilities organized as disclosed by a second co-pending application Serial No. 232,524 filed June 20, 1951, in the names of John A. Lasater and Thomas A. Deakins with title of "Cope Stripper and Cooling Loop for Mold Assembling Mechanism" and issued on July 26, 1955 as U. S. Patent No. 2,713,703.

In accordance with that second co-pending application Serial No. 232,524: (*a*) the outer mold car track shown at 32 by Fig. 1 hereof is opened at cope shake out 47 and extended into a cooling loop (shown at 360 by Fig. 1A of said application) through the added track length of which the mold cars 33 pass before returning for repassage beside cope shake out 47 on their way to car drive mechanism 35 and casting shake out 45; and (*b*) the return portion of this cooling loop has positioned thereover a length of cope stripper track (shown at 362 by Figs. 1A, 8, 9, 10 of said application) organized to lift the copes 14 away from the drags 12 on the moving cars 33 and to convey those lifted copes directly upon cope shake out 47 without requirement for any assistance from an operator.

The Station V mold take-off and lowerator improvement of the present invention are directly applicable to an extended system wherein said cope stripper and cooling loop facilities are included as taught by said second copending application Serial No. 232,524; and our present invention operates in said extended system in the same manner as disclosed and described herein.

*Summary*

The technique and facilities herein disclosed accordingly have practical utility of a high order and the specific mold take-off and lowerator functions described therefor are accordingly to be interpreted in an illustrative rather than in a restrictive sense.

It will thus be seen that our invention betters the performance of and cuts down the number of operators needed to run a complete mold assembling installation of the mechanized type here considered; that our inventive improvements provide means identified with the mechanized installation's Mold-Off Station V for acting upon each assembled mold that is delivered by the central assembling machine to said station by first automatically withdrawing the mold from the machine and turning it horizontally through 90°, and then automatically setting the mold down upon an empty car approaching Station V on the outer mold car track for conveyance by that car into the installation's pouring area; that these new take off and lowerator facilities are organized so that each assembled mold delivered by the central assembling machine to Station V will be withdrawn from the machine and lowered upon a conveying car entirely automatically without requirement for assistance from any operator at that station; that said new facilities are interrelated with the installation's car driving means in such a way that delay or stoppage in the aforesaid delivery of assembled molds to the empty mold cars approaching Station V will automatically stop the entire train of those cars until normal delivery is resumed, when the train will automatically be restarted; and that our invention has provided other coordinations and control interlocks which facilitate progress of the mold components through the complete installation's mechanized cycle of mold assembly and casting production.

Our inventive improvements are therefore extensive in their adaption and hence are not to be restricted to the specific form herein disclosed by way of illustration.

What we claim is:

1. In apparatus for lowering from a take-off track at one elevation to mold cars moving along a car track at a lower elevation assembled molds each made up of a cope resting upon the top of a lower drag that has one outer support bar extending along its left side and another outer support bar extending along its right side, the combination of a frame spanning said car track and extending upwardly therefrom to the exit end of said take-off track; a mold carriage within said frame having left and right rows of side rollers extending generally parallel to said car track from an end of said carriage abutting said take-off track's exit end; and means for moving said mold carriage between a top position wherein an assembled mold is enterable from said take-off track into the carriage with the mold drag's said left and right side bars riding upon said left and right rows of carriage rollers and a bottom position wherein those roller rows have lowered said mold to a point where the bottom of its drag is in proximity to the top of a mold car traveling along said car track.

2. In apparatus for lowering assembled molds from a take-off track at one elevation to mold cars moving along a car track at a lower elevation, the combination of a frame spanning said car track and extending upwardly therefrom to the exit end of said take-off track; a mold carriage movable up and down within said frame between a top position and a bottom position and being provided with left and right rows of side rollers mounted for movement toward and away from each other and adapted when the carriage is in said top position to receive an assembled mold enterable upon the rollers from said take-off track's exit end and adapted when the carriage is in said bottom position to permit engagement of the bottom of said mold with the top of a mold car traveling along said car track; means responsive to arrival of said carriage in its bottom position for spreading said roller rows sidewise out of engagement with the lowered mold; means responsive to said spreading for returning said carriage to its top position; and means responsive to travel by said carriage towards said top position for returning said roller rows to their original unspread position in readiness for receiving another mold from said take-off track.

3. In apparatus for lowering from a take-off track at one elevation to mold cars moving along a car track at a lower elevation assembled molds each made up of a cope resting upon the top of a lower drag that has one outer support bar extending along its left side and another outer support bar extending along its right side; the combination of a frame spanning said car track and extending upwardly therefrom to the exit end of said take-off track; a mold carriage within said frame having left and right rows of side rollers extending generally parallel to said car track from an end of said carriage that abuts with the exit end of said take-off track; means for moving said mold carriage between a top position wherein an assembled mold is enterable from said take-off track into the carriage with the mold drag's said left and right side bars riding upon said left and right rows of side rollers and a bottom position wherein those roller rows have lowered said mold so that the bottom of its drag is engageable with the top of a mold car traveling along said car track; and left and right stationary rows of rollers mounted within the lower side portions of said frame at an elevation slightly above that of said carriage roller rows when in said bottom position with individual rollers in said stationary rows being disposed intermediate individual rollers in said carriage rows whereby lowering of said carriage to its said bottom position transfers said left and right side bars on the mold drag from support by the rollers in said carriage rows to support by the rollers in said stationary rows.

4. In apparatus for lowering from a take-off track at one elevation to mold cars moving along a car track at a lower elevation assembled molds each made up of a cope resting upon the top of a lower drag that has one outer support bar extending along its left side and another support bar extending along its right side, the combination of a frame spanning said car track and extending upwardly therefrom to the exit end of said take-off track; a mold carriage within said frame movable between a top position and a bottom position and being provided with left and right rows of side rollers mounted for movement toward and away from each other and adapted when the carriage is in said top position to receive an assembled mold enterable from the take-off track into the carriage with the mold drag's said left and right side bars riding upon said left and right rows of side rollers and adapted when the carriage is in said bottom position to dispose the mold with the bottom of its drag in proximity to the top of a mold car traveling along said car track; left and right rows of stationary rollers mounted within the lower side portions of said frame at an elevation slightly above that of said carriage roller rows when in said bottom position with individual rollers in said stationary rows being disposed intermediate individual rollers in said carriage rows whereby lowering of said carriage to its said bottom position transfers said left and right side bars on the mold drag from support by the rollers in said carriage rows to support by the rollers in said stationary rows; means responsive to arrival of said carriage in its bottom position for spreading said carriage roller rows sidewise out of engagement with the lowered mold's drag side bars; means responsive to said spreading for returning said carriage to its top position; and means responsive to travel by said carriage towards said top position for returning said rows of carriage rollers to their original unspread position in readiness for receiving another mold from said take-off track.

5. In apparatus for lowering assembled molds from a take-off track at one elevation to mold cars moving along a car track at a lower elevation, the combination of a frame spanning said car track and extending upwardly therefrom to the exit end of said take-off track; left and right stationary rows of rolltrs mounted within the lower side portions of said frame along the left and right sides of the said mold cars traveling therethrough upon said car track with each of said roller rows inclining downwardly in the direction of mold car travel; and means within said frame for receiving an assembled mold from said take-off track and for lowering that mold upon said left and right roller rows which due to their aforesaid inclination support the mold with the leading bottom edge thereof closer to the mold car top therebeneath than is the mold's trailing bottom edge.

6. In apparatus for lowering from a take-off track at one elevation to mold cars moving along a car track at a lower elevation assembled molds each made up of a cope resting upon the top of a lower drag that has one outer support bar extending along its left side and another outer support bar extending along its right side, the combination of a frame spanning said car track and extending upwardly therefrom to the exit end of said take-off track; a mold carriage within said frame having left and right rows of side rollers extending from said take-off track's exit end through the carriage in generally parallel relation to said car track; means for moving said carriage between a top position wherein an assembled mold is enterable from the take-off track into the carriage with the mold drag's said left and right side bars riding upon said left and right rows of carriage rollers and a bottom position wherein those roller rows have lowered said mold in proximity to the top of a mold car traveling along said car track; left and right rows of stationary rollers mounted within the lower side portions of said frame at an elevation slightly above that of said carriage rollers when in said bottom position and inclining downwardly in the direction of mold car travel with individual rollers in said stationary rows being disposed intermediate individual rollers in said carriage rows whereby lowering of said carriage to its said bottom position transfers said left and right side bars on the mold drag from support by the rollers in said carriage rows to support by the rollers in said stationary rows which latter roller rows by reason of their aforesaid downward inclination dispose the leading bottom edge of the mold's drag closer to the mold car top therebeneath than that drag's trailing bottom edge.

7. In apparatus for lowering assembled molds from a take-off track at one elevation to mold cars moving along a car track at a lower elevation, the combination of a frame spanning said car track and extending upwardly therefrom to the exit end of said take-off track; left and right stationary rows of rollers mounted within the lower side portions of said frame along the left and right sides of the said mold cars traveling therethrough upon said car track with each of said roller rows inclining downwardly in the direction of mold car travel; means within said frame for receiving an assembled mold from said take-off track and for lowering that mold upon said left and right roller rows which due to their aforesaid inclination support the mold with the leading bottom edge thereof closer to the mold car top therebeneath than is the mold's trailing bottom edge; and knuckle projections extending upwardly from the forward top portion of each of said mold cars whereby upon movement of a car beneath a mold resting on said roller rows in the manner aforesaid those projections engage behind said leading bottom edge of the mold to pull the mold with the moving car forwardly along said roller rows out of said frame and thence fully upon the car.

8. In apparatus for lowering from a take-off track at one elevation to mold cars moving along a car track at a lower elevation assembled molds each made up of a cope resting upon the top of a lower drag that has one outer support bar extending along its left side and another outer support bar extending along its right side, the combination of a frame spanning said car track and extending upwardly therefrom to the exit end of said take-off track; left and right stationary rows of rollers mounted within the lower side portions of said frame at an elevation somewhat above the tops of said mold cars passing along the car track through the frame with each of said roller rows inclining downwardly in the direction of mold car travel; means within said frame for receiving an assembled mold from said take-off track and for lowering the mold between said left and right roller rows so as to rest the mold drag's aforesaid side bars thereon whereby through those side bars said inclined roller rows support the mold with the leading bottom edge of its drag closer to the mold car top therebeneath than is the drag's trailing bottom edge; and knuckle projections extending upwardly from the forward top portion of each of said mold cars whereby upon movement of a car beneath a mold resting on said roller rows in the manner aforesaid those projections engage behind said leading bottom edge of the mold drag to pull the mold with the moving car forwardly along said roller rows out of said frame and thence fully upon the car.

9. In combination a car track having thereon mold cars coupled into a train; means including a motor for driving said train of cars along said track; a lowerator frame spanning said track and extending upwardly therefrom; a carriage within said frame movable between a top position wherein an assembled mold is receivable thereby and a bottom position wherein such received mold is lowered for deposit upon one of said cars moving along said track; means responsive to completion of such lowering for releasing the mold from the carriage and returning the carriage to said top position in readiness to receive another assembled mold; means effective upon travel by said first mold on a car in said train completely out of said frame for moving said carriage with another mold therein downwardly to said bottom position wherein said other mold is deposited upon a succeeding car in said train; and means responsive to failure in the deposit of said other mold upon said succeeding car for de-activating said car drive motor and thereby stopping said train.

10. In an installation comprising a car track having thereon mold cars coupled into a train, the combination of a motor for driving said train of cars along said track; a lowerator frame spanning said track and extending upwardly therefrom; a carriage within said frame movable between a top position wherein an assembled mold is receivable thereby and a bottom position wherein such received mold is lowered for deposit upon one of said cars moving along said track; means responsive to such lowering for returning the carriage to said top position in readiness for reception of another assembled mold; a control device responsive to the presence of a mold within the lower portion of said frame; means governed by said device for moving said carriage with another mold therein downwardly to said bottom position as soon as said first mold has been moved completely out of said frame on a car in said train; and means also controlled by said device and including a timer for de-activating said car drive motor and stopping said train if within a given time following travel by the first mold completely out of said frame said other mold should not be delivered by the carriage into the frame's aforesaid lower portion in readiness for deposit upon the next succeeding car in said train.

References Cited in the file of this patent

UNITED STATES PATENTS

| | | |
|---|---|---|
| 1,570,658 | Wickland et al. | Jan. 26, 1926 |
| 1,734,174 | McCabe | Nov. 2, 1929 |
| 1,736,364 | Ramsden | Nov. 19, 1929 |
| 1,789,860 | Bennington | Jan. 20, 1931 |
| 1,849,385 | Sekulski | Mar. 15, 1932 |
| 1,985,942 | McIlvaine | Jan. 1, 1935 |
| 2,013,278 | Luton | Sept. 3, 1935 |
| 2,095,151 | O'Connor | Oct. 5, 1937 |
| 2,102,378 | Nicholls | Dec. 14, 1937 |
| 2,197,212 | Hagemeyer | Apr. 16, 1940 |
| 2,276,127 | Wahl | Mar. 10, 1942 |
| 2,325,889 | Thompson | Aug. 3, 1943 |
| 2,376,176 | Neja | May 15, 1945 |
| 2,508,698 | Von Beren | May 23, 1950 |
| 2,508,861 | Jessen | May 23, 1950 |
| 2,525,572 | Woody et al. | Oct. 10, 1950 |
| 2,535,979 | Witte | Dec. 26, 1950 |
| 2,548,767 | Brest | Apr. 10, 1951 |
| 2,600,206 | Christensen | June 10, 1952 |
| 2,626,040 | Lamb | Jan. 20, 1953 |

FOREIGN PATENTS

| | | |
|---|---|---|
| 318,952 | Great Britain | Sept. 13, 1929 |
| 249,270 | Switzerland | Apr. 1, 1948 |